United States Patent
Perez-Cordova

(10) Patent No.: US 8,491,796 B2
(45) Date of Patent: Jul. 23, 2013

(54) TREATMENT OF SOLID-STABILIZED EMULSIONS

(75) Inventor: Ramon Perez-Cordova, San Pedro Garza Garcia N.L. (MX)

(73) Assignee: Racional Energy & Environment Company, Reno, NV (US)

( * ) Notice: Subject to any disclaimer, the term of this patent is extended or adjusted under 35 U.S.C. 154(b) by 90 days.

(21) Appl. No.: 12/716,236

(22) Filed: Mar. 2, 2010

(65) Prior Publication Data

US 2010/0219133 A1 Sep. 2, 2010

Related U.S. Application Data

(60) Provisional application No. 61/156,736, filed on Mar. 2, 2009.

(51) Int. Cl.
*B01D 17/04* (2006.01)

(52) U.S. Cl.
USPC ............ 210/708; 210/737; 210/774; 210/775

(58) Field of Classification Search
USPC .......................................................... 210/708
See application file for complete search history.

(56) References Cited

U.S. PATENT DOCUMENTS

| | | | | |
|---|---|---|---|---|
| 2,751,998 A * | 6/1956 | Glasgow | ............................ | 95/24 |
| 2,786,543 A * | 3/1957 | Hayes et al. | ..................... | 96/184 |
| 2,903,243 A * | 9/1959 | Erwin | ............................ | 165/133 |
| 3,312,044 A * | 4/1967 | McCarter | ........................ | 96/159 |
| 3,394,530 A | 7/1968 | O'Neill et al. | | |
| 3,672,127 A * | 6/1972 | Mayse et al. | .................... | 204/662 |
| 3,727,382 A * | 4/1973 | Jackson | ........................... | 96/174 |
| 3,849,285 A * | 11/1974 | Prestridge | ..................... | 204/663 |
| 4,174,751 A * | 11/1979 | Compton | ..................... | 166/256 |
| 4,194,972 A * | 3/1980 | Weintraub et al. | ........... | 210/708 |
| 4,582,629 A * | 4/1986 | Wolf | ............................. | 516/143 |
| 5,132,011 A * | 7/1992 | Ferris | ............................. | 96/184 |
| 5,865,992 A * | 2/1999 | Edmondson | ................... | 210/180 |
| 6,537,458 B1 * | 3/2003 | Polderman | .................... | 210/801 |
| 7,014,774 B2 * | 3/2006 | Yamada et al. | ............... | 210/708 |
| 7,736,518 B2 * | 6/2010 | Smith et al. | .................... | 210/708 |

* cited by examiner

*Primary Examiner* — Tony G Soohoo
*Assistant Examiner* — Peter Keyworth
(74) *Attorney, Agent, or Firm* — Daniel N. Lundeen; Lundeen & Lendeen PLLC

(57) ABSTRACT

An emulsion treating unit and process. A subcooled boiling zone in the unit comprises a heat transfer surface to contact an emulsion at a temperature in excess of the saturation temperature of an aqueous phase in the emulsion, wherein the boiling zone is atmospherically vented. The unit also provides means for recovering an oil-rich layer from adjacent a vapor-liquid interface; and means for recovering an aqueous-rich layer from below the oil-rich layer. The process provides operation of the treating unit to heat an emulsion in the subcooled boiling zone, wherein the boiling zone is atmospherically vented, recovering an oil-rich layer and recovering an aqueous-rich layer from below the oil-rich layer. In one embodiment the boiling zone comprises a heat transfer surface having a temperature in excess of the saturation temperature of the aqueous-rich layer, wherein the vapor-liquid interface is subcooled with respect to the saturation temperature of the aqueous layer.

18 Claims, 10 Drawing Sheets

TREATMENT OF SOLID-STABILIZED EMULSIONS

CROSS REFERENCE TO RELATED APPLICATIONS

This application claims the benefit of and priority to U.S. Pat. No. 6,115,6736 filed Mar. 2, 2009.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

This application relates to treatment processes and equipment for difficult-to-separate emulsions, and more particularly to treatment of solid-stabilized emulsions.

Most formations bearing hydrocarbons simultaneously produce oil, gas and an aqueous phase, usually brine. Several wells can be tied together through a gathering line into a separation or processing plant, sometimes comprising just a simple tank, where initial gravity separation of water, oil and gas occurs. Water in oil emulsions containing clay and/or silica are common in oil production activities. In oil tankers and refineries, in addition to abundant oil/water emulsion sources, sludge and tank bottoms are also common. Estimates of the volume of emulsion that must be processed are approximately 1 percent of the total worldwide oil production.

Theoretically, gas is taken from the top, water and sediments are drawn from the bottom, and the oil is drawn from the middle of the mixture. However, the mixture can form emulsions which only partially separate by gravity settling and are very difficult or nearly impossible to completely separate by other means. Further, the water stream from the initial separator frequently contains solids and residual emulsified oil making disposal a significant problem, both ecologically and economically. The waste water is often stored in holding ponds where an oily sludge separates out and is recovered for disposal.

Emulsions are generally held together by different interfacial polar and non-polar forces, creating emulsions having a range of stability from low, i.e. relatively easy to separate into oil and water phases, to high or very difficult to separate. The emulsions can be difficult to treat when they contain stabilizing solids such as colloidal silica and clay, particularly nano-clay particles, which are frequently present in producing formations and form an especially stable emulsion, sometimes forming an intermediate emulsion rag layer, which can have a rheology that is highly viscous, gelatinous and/or doughy, usually depending on the temperature. Strong interfacial forces can appear when colloidal disperse-phase particles interact with nano-size clay particles to form the super-stable complex mixture of colloidal liquid droplets and suspended solids in the rag layer.

Breaking emulsions is generally a process of neutralizing the charges between the oil and water interfaces, allowing water and oil droplets to coalesce into larger drops, and to generate two continuous phases to transform the crude oil into a useable anhydrous form for subsequent refinery operations. As used herein, an emulsion is the intimate two-phase mixture of hydrophobic and aqueous phases, with one phase dispersed, as minute globules sometimes called micelles, inside a continuous phase sometimes referred to as the matrix. These micelles are stabilized by an interfacial film, so that the micelles cannot coalesce, and do not respond well to gravity settling. Emulsions where oil micelles are surrounded by water are referred to as oil-in-water emulsions; and where aqueous micelles are surrounded by oil, as water-in-oil or invert emulsions. Both oil-in-water and invert emulsions may be encountered, thus, emulsions could be polar or non-polar depending on the type of force that dominates. Further, the polar forces can be dominated by either cationic or anionic charges, or a dual combination that is sometimes referred as a double layer film or onion skin emulsion. Improper treatment of one type may invert the emulsion to the opposite type.

Oil/water emulsions are normally treated with heat, chemicals and/or centrifuges to separate the oil, water and solids. Heat, steam, frac tanks, chemicals and centrifuges are commonly used in a very energy intensive and costly manner, and moreover can be slow.

U.S. Pat. No. 6,033,448 notes problems caused by gasifying a hydrocarbon stream comprising water and discloses the application of heat and pressure to separate a sludge into a water-lean fuel layer which can be supplied to a gasifier.

U.S. Pat. No. 67,877,027 further heats the sludge by recycling a portion of the hot oil to mix with the sludge, supplying the remaining hot oil to the gasifier.

BRIEF SUMMARY OF THE INVENTION

The present invention provides various embodiments of methods and apparatus to treat solid-stabilized oil-water emulsions to recover a solids-lean, oil-rich product. In an embodiment, heat is derived from a relatively minor portion or fraction of the emulsion to heat a primary stream of the emulsion in an emulsion breaker which separates the emulsion into water-lean, oil-rich and oil-lean, water-rich aqueous layers.

In one embodiment, the invention is directed to a process comprising heating an emulsion in a subcooled boiling zone, recovering an oil-rich layer from adjacent a vapor-liquid interface, and recovering an aqueous-rich layer from below the oil-rich layer. In an embodiment, the boiling zone is atmospherically vented. In an embodiment, the boiling zone comprises a heat transfer surface in contact with the emulsion which has a temperature in excess of the saturation temperature of the aqueous-rich layer, wherein the vapor-liquid interface is subcooled with respect to an aqueous phase in the emulsion.

In an embodiment, the apparatus comprises a furnace to oxidize a portion or fraction of the emulsion to produce hot effluent gases, and an emulsion breaker vessel having a heat exchanger submerged below a liquid overflow level to recover heat from the hot effluent gases and heat the emulsion to facilitate separation into oil-rich and aqueous layers. As used herein, oxidation can include partial oxidation or gasification wherein the effluent gases are oxygen-lean and rich in carbon monoxide and/or hydrocarbons, or can include combustion with a stoichiometric equivalent or excess of oxygen, in either single-stage or two-stage oxidation and combustion.

DETAILED DESCRIPTION OF THE INVENTION

Figure 1A:
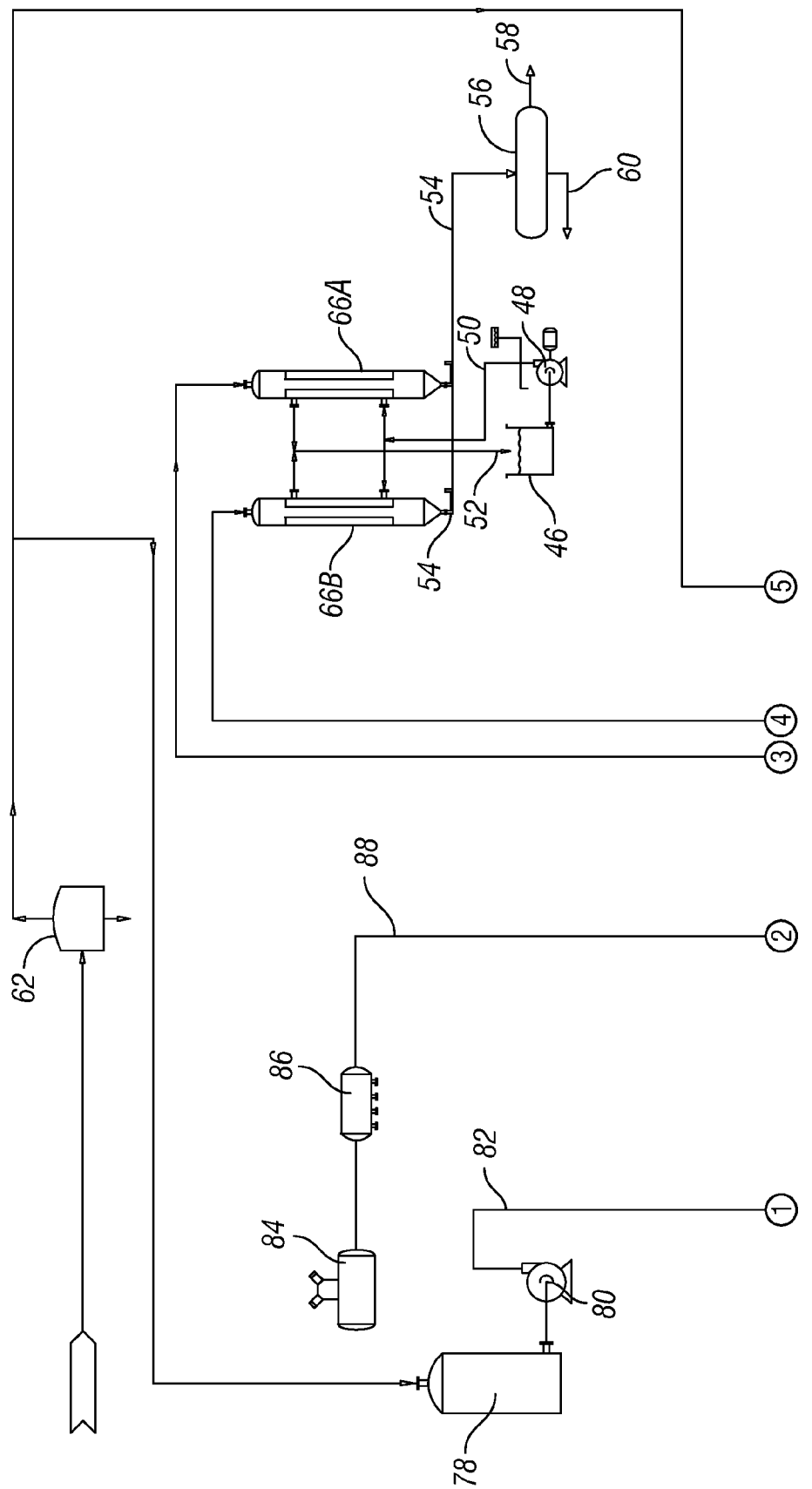
FIGS. 1A and 1B taken together are a schematic process flow sheet according to an embodiment of the invention.

In one embodiment, an emulsion treater comprises a subcooled boiling zone comprising a heat transfer surface in contact with an emulsion at a temperature in excess of the saturation temperature of an aqueous phase in the emulsion. In an embodiment, the boiling zone is atmospherically vented. In an embodiment, the emulsion treater includes a line to recover an oil-rich layer from adjacent a vapor-liquid interface, and a line to recover an aqueous-rich layer from below the oil-rich layer.

In another embodiment, an emulsion treater used for treating an emulsion according to the process described herein comprises heat transfer means for heating an emulsion in an atmospherically vented subcooled boiling zone, overflow means for recovering an oil-rich layer from adjacent a vapor-liquid interface, and drain means for recovering an aqueous-rich layer from below the oil-rich layer.

In an embodiment, the emulsion treater comprises a flow control system to heat a heat transfer surface in the boiling zone to a temperature in excess of the saturation temperature of the aqueous-rich layer, and to maintain subcooling at the vapor-liquid interface with respect to the aqueous layer.

In embodiments, the temperature of the heat transfer surface is above 100° C., 105° C., 110° C., 125° C. or 150° C., whereas the vapor-liquid interface can have a maximum temperature of 105° C., 104° C., 103° C., 102° C., 101° C. or 100° C., a minimum temperature of 95° C., 96° C., 97° C., 98° C., 99° C. or 100° C., or a temperature within a range from any one of the minimum temperatures to any higher one of the maximum temperatures. In an embodiment, the emulsion treater can include a furnace to indirectly heat the heat transfer surface with relatively hot gas at a temperature from 400° C. to 1200° C., preferably at least 800° C. In an embodiment, the emulsion treater has a subcritical heat flux at the heat transfer surface for nucleate boiling.

In an embodiment, the emulsion treater can have a vent line to maintain a gauge pressure at the vapor-liquid interface less than 200 kPa, less than 100 kPa, less than 50 kPa, less than 20 kPa, or less than 10 kPa. In an embodiment, the a vent line can maintain a partial pressure of water vapor at the vapor-liquid interface less than one atmosphere absolute. In an embodiment, the boiling zone is disposed in an atmospheric or essentially atmospheric vessel, i.e. a vessel vented directly or indirectly to the atmosphere through precess piping and open valves without pressure regulation.

In an embodiment, the emulsion treater can have a vent line from a vapor space to a condenser, e.g., a condenser vented to atmospheric pressure. In an embodiment, a separator can receive and separate the condensed liquid from the condenser to recover oil and aqueous condensate streams.

In an embodiment, the emulsion treater comprises a firetube submerged in the oil-rich layer below the vapor liquid interface. In an embodiment, the firetube comprises an assembly of a plurality of horizontal tubes. In an embodiment, the firetube assembly comprises an inlet manifold to distribute a hot gas supply into a plurality of supply tubes. In an embodiment, the firetube assembly further comprises a return manifold to collect the hot gas from the plurality of supply tubes into a return tube. In an embodiment, the plurality of tubes are arrayed in a plurality of rows and columns. In an embodiment, the tubes in each column are vertically aligned, and can be laterally spaced apart. In an embodiment, the rows are horizontally aligned. In an embodiment, the emulsion treater comprise baffles disposed transversely to the horizontal tubes of the firetube assembly for liquid crossflow outside the horizontal tubes.

In an embodiment, the emulsion treater comprises upright drain pipes disposed in the lateral spacing between the columns. In an embodiment, the emulsion treater comprises an oil transfer pipe disposed below the firetube assembly to remove the oil-rich layer, and the oil transfer pipe can be aligned with one of the columns.

In an embodiment, the emulsion treater comprises an emulsion preheating chamber in indirect heat exchange with a vapor space above the vapor-liquid interface. In an embodiment, the emulsion treater can include a reflux path for condensate from a cooling surface in the vapor space to the boiling zone, such as, for example, sloping roof and/or side walls to the vapor-liquid interface. In an embodiment, the emulsion treater comprises an atmospheric vent from the emulsion preheating chamber. In an embodiment, an emulsion downcomer is provided from the emulsion preheating chamber into the boiling zone.

In an embodiment, the boiling zone comprises: a horizontally elongated tank wit an emulsion inlet zone adjacent one end and an overflow at the opposite end zone into the oil-rich layer recovery line; a plurality of longitudinal heat transfer surfaces below the vapor-liquid interface; a liquid flow path from the emulsion inlet zone to the overflow zone; and a bottoms drain into the aqueous-rich layer recovery line. In an embodiment, the emulsion treater comprises a plurality of transverse baffles in the boiling zone for liquid crossflow against the plurality of longitudinal heat transfer surfaces. In an embodiment, the baffles can define liquid flow windows alternated above and below the baffles, for example, over a first baffle adjacent the emulsion inlet, under the next baffle, over the next and so on until the liquid reaches the overflow.

In an embodiment, the emulsion treater comprises: a secondary settling chamber to receive the oil-rich layer; an overflow line from the secondary settling chamber to recover a water-lean layer; and a line to recover an oil-lean layer from below the water-lean layer. In an embodiment, the emulsion treater can include an injection line into the secondary settling chamber for water treatment chemicals. In an embodiment, the emulsion treater comprises an electrocoagulator in the secondary settling chamber. In an embodiment, the emulsion treater comprises a horizontally elongated vessel housing the boiling zone and the secondary settling chamber and a partition wall between the boiling zone and the secondary settling chamber.

In an embodiment, an emulsion inlet to the boiling zone is disposed adjacent the partition wall, and/or an inlet for the oil-rich layer to the secondary settling chamber is disposed adjacent the partition wall. In an embodiment, the partition wall is thermally conductive to allow indirect heat transfer between the boiling zone and the secondary settling chamber, e.g. to allow cross exchange between the relatively hot oil entering the secondary settling chamber with the relatively cool emulsion entering the boiling zone. In an embodiment, the emulsion treater comprises an atmospheric vent from the secondary settling chamber.

In an embodiment, the emulsion treater comprises a pretreater for an emulsion feedstock to obtain a pretreated emulsion feed to the boiling zone, wherein the pretreated emulsion feed has a lower water content relative to the emulsion feedstock. In an embodiment, the pretreater comprises a gravity separator and/or a centrifuge.

In an alternative or additional embodiment, the emulsion treater can comprise a horizontally elongated vessel with a partition wall between a primary chamber and a secondary chamber. The primary chamber can include: a subcooled boiling zone; a first vapor space; an atmospheric vent in communication with the vapor space; a vapor-liquid interface between the boiling zone and the vapor space; a preheating chamber in indirect heat exchange relationship with the vapor space and spaced above the vapor-liquid interface; a downcomer for emulsion from the preheating chamber into the boiling zone adjacent the partition wall; an overflow assembly at a first end of the vessel opposite the partition wall to drain an oil-rich layer from adjacent the vapor-liquid interface into an oil transfer pipe disposed adjacent a bottom of the primary chamber; a primary bottoms drain to recover an aqueous-rich layer from the primary chamber; a firetube assembly disposed below the vapor liquid interface comprising a plurality of longitudinal tubes with external heat transfer surfaces; and a liquid flow path from the downcomer through the boiling zone across the plurality of longitudinal tubes to the overflow assembly.

In an embodiment, the secondary chamber can include: an inlet zone adjacent the partition wall to receive the oil-rich layer from an end of the oil transfer pipe; an overflow weir at a second end of the vessel opposite the partition wall to drain an aqueous-lean layer from an upper liquid surface in the secondary chamber; a secondary bottoms drain to recover an aqueous-rich layer from the secondary chamber; and a flow path from the inlet zone through the secondary chamber to the overflow weir.

In an embodiment, the vessel can be mounted on a transportable skid. In an embodiment, the vessel comprises a horizontal cylindrical tank. In an embodiment, the partition wall can form a fluid seal between the primary and secondary chambers, and the oil transfer pipe can pass through the partition wall to hydraulically couple the overflow assembly of the primary chamber to the inlet zone of the secondary chamber. In an embodiment, the inlet zone is disposed adjacent a bottom of the secondary chamber.

In an embodiment, baffles are disposed in the boiling zone for liquid crossflow across the tubes. In an embodiment, a hot gas manifold at the first end of the vessel can supply hot gas to the firetube assembly. In embodiments, the emulsion treater can further include atmospheric vents from a vapor space in the preheat chamber and/or from a vapor space in secondary chamber. In an embodiment, the emulsion treater can comprise a flow control system to control the rate of continuous emulsion feed to the preheating chamber relative to hot gas continuously supplied to the firetube assembly to maintain the external heat transfer surfaces of the firetube assembly at a temperature in excess of the boiling point of the aqueous phase while maintaining subcooling conditions in the primary chamber to vaporize less than 1 percent of the water in the emulsion feed.

In another embodiment, the present invention provides a process, comprising: heating an emulsion in a subcooled boiling zone, wherein the boiling zone is atmospherically vented; recovering an oil-rich layer from adjacent a vapor-liquid interface; and recovering an aqueous-rich layer from below the oil-rich layer. In an alternative or additional embodiment, the process uses the emulsion treater described above wherein the emulsion is processed by operating the emulsion treater, i.e., the process in this embodiment comprises operation of the emulsion treater.

In an embodiment, the boiling zone in the process comprises a heat transfer surface having a temperature in excess of the saturation temperature of the aqueous-rich layer, and wherein the vapor-liquid interface is subcooled with respect to the aqueous layer. In an embodiment, the oil-rich layer is recovered as an overflow stream. In an embodiment, the heat transfer surface is maintained at a temperature above 100° C., 105° C., 110° C., 125° C. or 150° C. In an embodiment, the vapor-liquid interface is maintained at a maximum temperature of 105° C., 104° C., 103° C., 102° C., 101° C. or 100° C., at a minimum temperature of 95° C., 96° C., 97° C., 98° C., 99° C. or 100° C., or within a range from any one of the minimum temperatures to any higher one of the maximum temperatures. In an embodiment, the process comprises a subcritical heat flux at the heat transfer surface for nucleate boiling.

In an embodiment, the process comprises treating an emulsion that is a solids-stabilized emulsion, e.g., containing primarily colloidal solid particles that cannot easily be separated by gravity separation or centrifuge. In an embodiment, the emulsion comprises clay particles. In an embodiment, the emulsion comprises oilfield sludge, refinery sludge or the like. In an embodiment, the emulsion comprises from 5 to 95 wt % oil and from 95 to 5 wt % water, or from 30 to 70 wt % oil and from 70 to 30 wt % water, by total weight of the oil and water. In another embodiment, the emulsion comprises from 5 to 30 wt % oil, from 10 to 25 wt % oil, or from 10 to 20 wt % oil, by total weight of the oil and water (excusive of solids). In an embodiment, the emulsion comprises from 0.1 up to 20 wt % solids, by total weight of the emulsion. The solids in an embodiment are comprised wholly or partly of clay particles, e.g., the emulsion can comprise from 0.1 up to 20 wt % clay particles, by total weight of the emulsion, and can optionally be mixed with solids other than clay. In an embodiment, the oil-rich layer is solids-lean, and in another embodiment, the aqueous-rich layer is solids rich. In another embodiment, the solids can be recovered as a sediment from either layer, preferably the aqueous layer.

In an embodiment, the process comprises vapor at the vapor-liquid interface that is saturated or subcooled. In an embodiment, the process comprises maintaining a gauge pressure at the vapor-liquid interface less than 200 kPa, less than 100 kPa, less than 50 kPa, less than 20 kPa or less than 10 kPa. In another embodiment, a partial pressure of water vapor at the vapor-liquid interface is less than one atmosphere absolute. In an embodiment, the heating and separation are effected in a vessel maintained essentially at atmospheric pressure, for example, the process can include venting a vapor space to atmospheric pressure.

In an embodiment, the process comprises venting a vapor space to a condenser. In an embodiment, the condenser is operated at essentially atmospheric pressure. In a further embodiment, the process comprises collecting condensate from the condenser, and can optionally include separating the condensate from the condenser to recover oil condensate and aqueous condensate streams. In embodiments, less than 10 percent of the water in the emulsion is vaporized across the vapor-liquid interface, or the proportion of water vaporized from the emulsion across the vapor-liquid interface can be less than 3 percent, less than 1 percent or less than 0.1 percent.

In an embodiment, the process comprises indirectly heating the heat transfer surface with relatively hot gas. In an embodiment, the process comprises supplying relatively hot gas within a tube submerged in the oil-rich layer below the vapor liquid interface. In an embodiment, the hot gas has a temperature in the heating tube from 400° C. to 1200° C., and in another embodiment, the hot gas has an inlet temperature of at least 800° C. In an embodiment, the hot gas has an outlet temperature from 400° to 600° C. In an embodiment, the tube is submerged in the oil-rich layer below the vapor liquid interface wherein the tube is disposed adjacent an inlet to an overflow tube. In an embodiment, the tube is submerged in the oil-rich layer below the vapor liquid interface and above the aqueous rich layer.

In an embodiment, the hot gas is continuously supplied at a rate and a temperature sufficient to maintain the temperature of the outside heat transfer surface (in contact with the emulsion) above the boiling point of the aqueous layer. In an embodiment, the emulsion is continuously supplied to the boiling zone at a rate and a temperature sufficient to maintain a bulk fluid temperature below the saturation temperature of the aqueous layer. In an embodiment, the bulk fluid temperature at the vapor-liquid interface effectively inhibits steam generation from the vapor-liquid interface.

In an embodiment, the hot gas comprises hydrocarbon combustion effluent. In an embodiment, the process comprises oxidizing emulsion to form the combustion effluent, and in another embodiment, oxidizing a first fraction of an emulsion feedstock to form the combustion effluent and supplying a second fraction of the emulsion feedstock to the boiling zone of the emulsion treater. In an embodiment, a weight ratio of the first fraction to the second fraction is from 1:100 to 20:100. In an embodiment, the oxidation comprises introducing the first fraction of the emulsion into a fluidized bed of solids with an oxygen-containing gas. In an embodiment, the emulsion is atomized with the oxygen-containing gas.

In an embodiment, the fluidized bed of solids comprises silica sand. If desired, makeup solids are fed into the bed and/or spent solids are continuously or periodically withdrawn from the bed. In an embodiment, the process comprises adding lime to the bed of solids, for example, in an amount effective to absorb sulfur and thereby provide a sulfur-lean effluent gas. In an embodiment, the oxidation produces CO in a first oxidation stage and in a second oxidation stage the CO is converted to $CO_2$. In an embodiment, the second oxidation stage comprises a catalytic converter to which a supplemental oxygen-containing gas is supplied.

In an embodiment, the process comprises pretreating an emulsion feedstock to obtain a pretreated emulsion for the heating, wherein the pretreated emulsion has a lower water content relative to the emulsion feedstock. In an embodiment, the pretreating comprises gravity separation at ambient temperature or at a temperature less than that of the boiling zone.

In an embodiment, the process comprises preheating the emulsion in indirect heat exchange with a vapor chamber above the vapor-liquid interface. In an embodiment, the process comprises refluxing condensate from a cooling surface in the vapor chamber to the boiling zone.

In an embodiment, the process comprises transferring the recovered oil-rich layer from the boiling zone to a secondary separation stage, recovering a water-lean oil stream from the secondary separation stage, and recovering an oil-lean aqueous stream from the secondary separation stage. In an embodiment, the process comprises injection of a water treatment chemical such as a coagulant or flocculant to facilitate removal of solids, for example, water glass, alum salts, polyelectrolytes, etc., into the recovered oil-rich layer, e.g. in a transfer pipe and/or in the secondary separation stage. In another embodiment, which can be in addition to or alternatively to the chemical addition, the process can comprise electrocoagulation, for example, in the secondary separation stage.

Figure 1B:
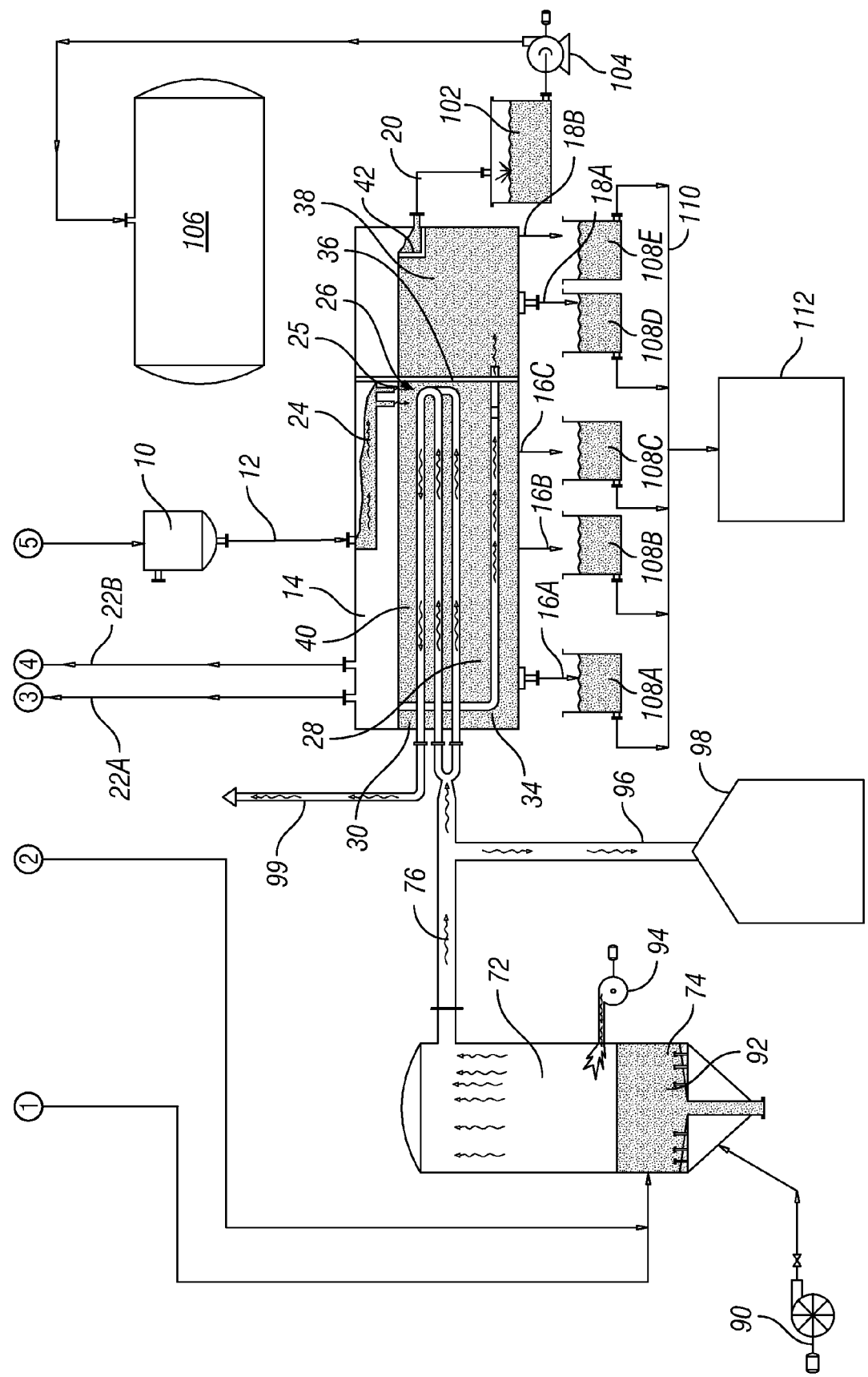

With reference to FIGS. 1A and 1B taken together, an emulsion treatment process is shown according to an embodiment. The emulsion to be processed is charged in tank 10 (FIG. 1B) and fed by line 12 into a treater 14 where it is heated and separated into aqueous streams 16A to 16C, 18A and 18B, oil stream 20 and vapor streams 22A, 22B. The emulsion feed enters treater 14 via preheat chamber 24 where it is heated up to a temperature that generally avoids steam generation, e.g. 60°-99° C., 70°-98° C., or about 92-97° C.

From the preheat chamber 24, the partially heated emulsion passes through downcomers 25 and enters an emulsion inlet zone 26 of a main heating chamber 28, according to the embodiment of FIG. 1B. The inlet zone 26 is adjacent one end of the heating chamber 28, and the emulsion is heated and separated into an upper layer of oil and a lower aqueous layer as the respective liquid layers pass to an overflow outlet area 30 and aqueous streams 16A to 16C. The oil layer overflows into the oil transfer pipe 34 which passes through partition wall 36 and then into secondary settling chamber 38. As it passes through the chamber 28, the emulsion is locally heated to the saturation temperature at the surfaces of the firetube assembly 40 by hot gas circulated tubeside at an elevated temperature from, e.g., about 400° C. up to about 1200° C. However, the bulk liquid temperature of the emulsion in the heating chamber 28, especially the upper surface at the vapor-liquid interface, is subcooled, i.e., kept below the saturation temperature of the aqueous phase in the emulsion.

The treater 14, according to the embodiment of FIG. 1B, is designed to minimize water vapor generation without excessively pressurizing the heating chamber 28 by locating the exposed hot surfaces of the firetube assembly 40 well beneath the upper level of the liquid in the chamber 28, e.g. with the top of the uppermost firetube surface at least one diameter below the top of the liquid level but with the bottom of the lowermost firetube surface above any separate aqueous phase, to allow the liquid head and subcooled bulk temperature to inhibit boiling at the vapor-liquid interface, and operating the treater 14 with sufficient throughput relative to the rate and temperature of the hot gases to avoid excessive exit temperatures. Any vapor generated in the heating chamber 28 is in one embodiment partially cooled against a surface of the preheat chamber 24 and passed overhead into lines 22A and/or 22B.

The oil from heating chamber 28 overflows and drains by gravity through the transfer pipe 34 into the secondary settling chamber 38, according to the embodiment of FIG. 1B. In operation, the emulsion is fed at a steady rate, and the vapor is vented overhead to maintain isobaric conditions in the treater 14. An aqueous phase is taken off from the bottoms at lines 16A/16B/16C, in one embodiment at a controlled steady rate to maintain an oil-water interface at a desired point, e.g. below the lower extent of the firetube assembly 40 in one embodiment to minimize heating of the aqueous phase. In another embodiment, the treater 14 is operated in a semi-batch mode wherein the interface rises as water accumulates in the lower layer until it reaches a predetermined level, below the assembly 40 in an embodiment, at which time the water is drawn down to lower the interface level and the valves closed to repeat the cycle.

The oil entering the secondary settling chamber 38 in an embodiment is subjected to a long residence time relative to the heating chamber, during which any residual water entrained is allowed to settle out and coalesce in an aqueous, oil-lean phase at the bottom of the chamber. If desired, additional steps can be taken to facilitate water and solids separation in the settling chamber 38, e.g., by the use of water treatment coagulants and/or an electrocoagulator. A recovered oil product with low basic sediment and water (BSW) content, less than 1 wt % in one embodiment, is recovered in line 20, via an overflow weir 42 in one embodiment. In an embodiment, the height of the overflow weir 42 is at or below the height of the inlet to the transfer pipe 34 from the heating chamber 28 to facilitate gravity drainage. Recovered oil from line 20 can be collected in holdup tank 102 and transferred via pump 104 to storage tank 106.

An aqueous phase is continuously or periodically drained off from the secondary chamber 38 via lines 18A and 18B to control the interface level between the oil layer and aqueous layer. The water collected via lines 16A, 16B, 16C, 18A and 18B can be collected in holding tanks 108A to 108E, and transferred via header 110 to storage tank 112 or other disposal or water treatment unit.

In an embodiment, the discharge end of the transfer pipe 34 is disposed adjacent one lateral end of the chamber 38 and the overflow weir 42 is disposed adjacent the opposite lateral end of the chamber 38, to provide a maximum residence time in the chamber 38 and avoid short circuiting. In an embodiment, the transfer pipe 34 is disposed below the liquid level established by the height of the overflow weir 42, and in an embodiment, above the oil-water interface, which is to say the water phase is withdrawn at a rate to maintain the interface below the height of the discharge end of the transfer pipe 34 into the chamber 38 to avoid mixing or turbulence in the water layer. In an embodiment, the height of the overflow weir 42 is adjustable to take into account the different densities of the oil and water layers and the emulsion, while facilitating hydraulic drainage from the primary chamber 28.

Vapor recovered via lines 22A and 22B can be cooled in respective atmospheric condensers 44A and 44B (FIG. 1A) by indirect heat exchange with cooling water or other heat transfer medium supplied shell-side in one embodiment from tank 46 and pump 48 via line 50 and returned via line 52. Condensate is collected via line 54 and separated in separator tank 56 into oil and water phases which are recovered via respective lines 58 and 60.

In one embodiment, especially where the emulsion to be processed has a relatively high water content or is not particularly stable, the emulsion can be pretreated with a centrifuge and/or in a conventional frac tank 62 (FIG. 1A). This can reduce the easily removed water and/or solids content so that the treater 28 processes the more difficult or stable portion of the emulsion.

Hot gases supplied to the firetube assembly 40 in one embodiment are generated by a pyrolysis unit 72 (FIG. 1B) from the emulsion feedstock, with or without pretreatment. Where the emulsion is used as a feed to the pyrolysis unit 72, it can be partially treated by gravity separation, centrifugation or the like to increase the oil content, or if two emulsions are available, the one with the higher oil content (higher heating value) can be used in an embodiment, or with the higher water content (lowest value) in another embodiment.

The pyrolysis unit 72 in the embodiment illustrated in FIG. 1B comprises a generally cylindrical refractory lined vessel 74 having a refractory-lined effluent pipe 76 that leads into the firetube assembly 40 as described above. Emulsion is supplied in the illustrated embodiment from tank 78 (FIG. 1A) via pump 80 and line 82, together with atomization air from compressor 84, tank 86 and line 88. Combustion air is supplied via turbine 90 in one embodiment below a fluidized solids bed 92. If needed, a supplemental gas heater 94 can be used to preheat the bed 92 for startup or in the event the emulsion has insufficient heating value.

In one embodiment, the lower end of the vessel 74 is located below grade so that the effluent pipe 76 feeds directly into firetube assembly 40 in a straight run without elevation change, wherein the treater unit 14 is positioned at or just slightly above grade. This embodiment allows the pipe 76 to be as short as possible to minimize both heat losses and pressure drop so as to maximize the efficiency of the pyrolysis unit 72. In one embodiment a portion of the hot effluent gas can be diverted via line 96 to an evaporator 98 or other process heat recovery unit. Cooled effluent gas from the firetube assembly 40 can be recovered in an embodiment via line 99 for subsequent processing such as heat recovery, hydrocarbon recovery or the like.

In an embodiment, the proportion of oil from the emulsion that is used for pyrolysis can be relatively low, e.g. less than 5%, less than 2%, or less than 1%, by weight of the oil in the emulsion. As one example, where the emulsion is an oilfield emulsion comprising 50 weight percent oil, 30 weight percent water and 20 weight percent solids, about 5 kg of emulsion might be gasified in the pyrolysis unit 72 to process 70 kg of emulsion in the treater 14, producing about 35 kg oil, about 14 kg solids (recovered with the bottoms water) and about 21 kg water, of which no more than approximately 10 percent (2.1 kg), preferably no more than 3 percent (0.6 kg) or no more than 1 percent (0.2 kg), is recovered from overhead vapor streams 22A and 22B. Ideally, the water vapor in overhead lines 22A, 22B is as close to zero as practicable, but where it is desirable to avoid pressurizing the treater 14 and atmospheric pressure conditions are employed, the proportion of the water in the emulsion processed in the treater unit 14 will generally be nonzero or at least 0.05, 0.1, 0.2, 0.5 or 1 percent, but should be under 20 percent, 15 percent, 10 percent, 5 percent, 3 percent or 1 percent, by weight of the water in the emulsion fed to the treater unit 14, in various embodiments.

Figure 2:
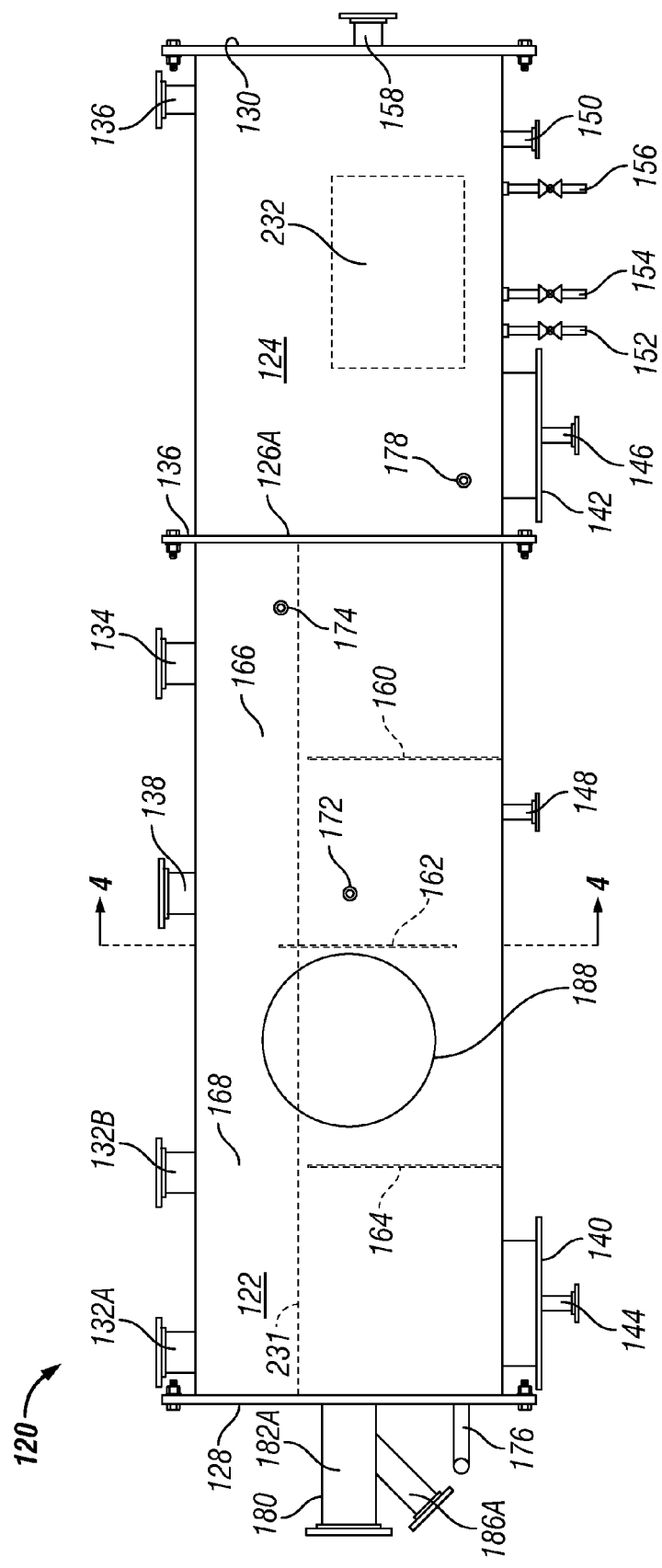
FIG. 2 is a schematic side view of an emulsion treater according to an embodiment of the invention.

With reference to FIGS. 2-9, wherein like parts are indicated by like numerals, another embodiment of an oil-water emulsion treater unit 120 is schematically shown. FIG. 2 is a side view of the unit 120 showing the unit as generally horizontal, cylindrical vessel composed of primary section 122 and secondary section 124 which are assembled together at the flanged connection 126, which is in one embodiment a blind connection forming a partition 126A generally preventing communication between the sections 122, 124. Blind flanges 128 and 130 are provided at the opposite ends of the primary section 122 and the secondary section 124, respectively.

Vapor outlets 132A, 132B, 134 and 136, and emulsion feed inlet 138, are provided along the top of the unit 120. Manholes 140, 142 are provided at the bottom of each section 122, 124, respectively. Water drawdown ports 144, 146 are provided in the cover of each manhole 140, 142. Additional water drawdown ports 148, 150 can be provided at the bottom in each section 122, 124 as desired. Sampling ports 152, 154, 156 are provided at the bottom of section 124. An oil outlet 158 is provided at the flange 130.

Internal baffles 160, 162, 164 are provided to direct cross-flow of the emulsion and/or liquid layers. The baffles 160, 164 rise from the bottom of the primary section 122, requiring liquid to pass through the windows 166, 168 over the tops thereof, whereas the baffle 162 provides an opening in the bottom but has an upper edge that lies generally above the upper surface of the liquid so that liquid is directed through the window underneath the baffle 162. Side sample ports 172, 174 and end sample port 176 are provided in the primary section 122, and side sample port 178 in the secondary section 124, as also seen in FIGS. 3 and 4.

Figure 3:
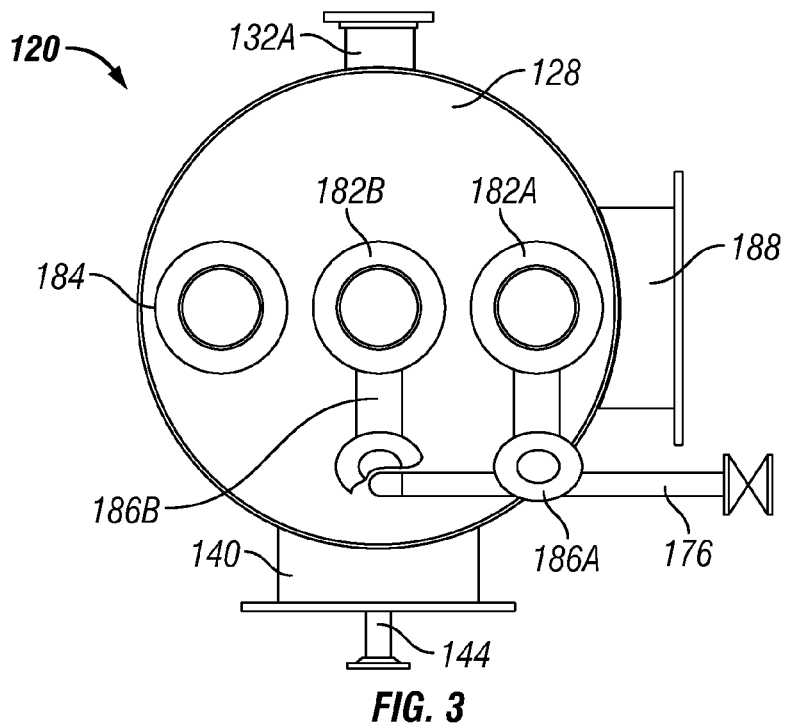
FIG. 3 is a schematic front end view, partially cut away, of the emulsion treater of FIG. 2 according to an embodiment of the invention.

A firetube assembly 180 comprises hot gas inlet nozzles 182A, 182B and outlet nozzle 184 as best seen in FIGS. 2 and 3. Respective side entries 186A and 186B can be provided to each of the inlet nozzles 182A, 182B for supplemental gas such as air, in one embodiment, for example, where additional combustion of CO or hydrogen and/or residual hydrocarbons in the hot gas can occur in the firetube assembly 180, with or without catalysis.

Figure 6:
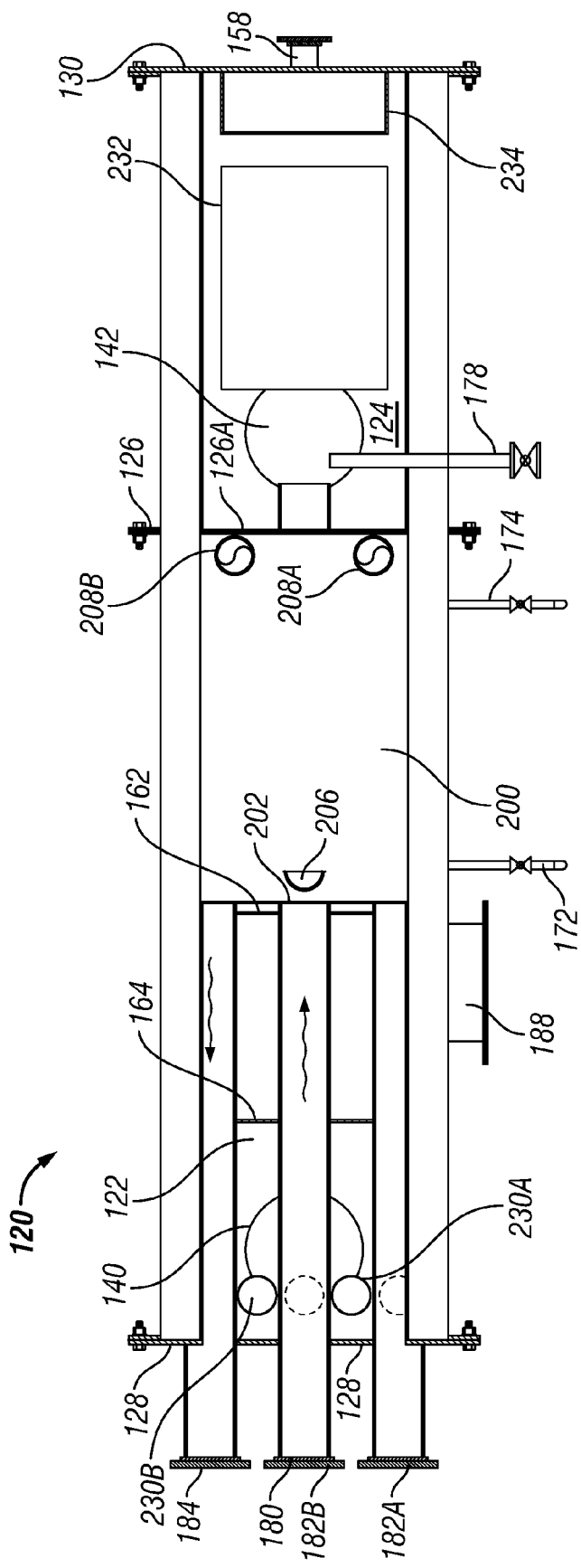
FIG. 6 is a schematic sectional view of the emulsion treater of FIG. 5 as seen along the lines 6-6 according to an embodiment of the invention.
Figure 7:
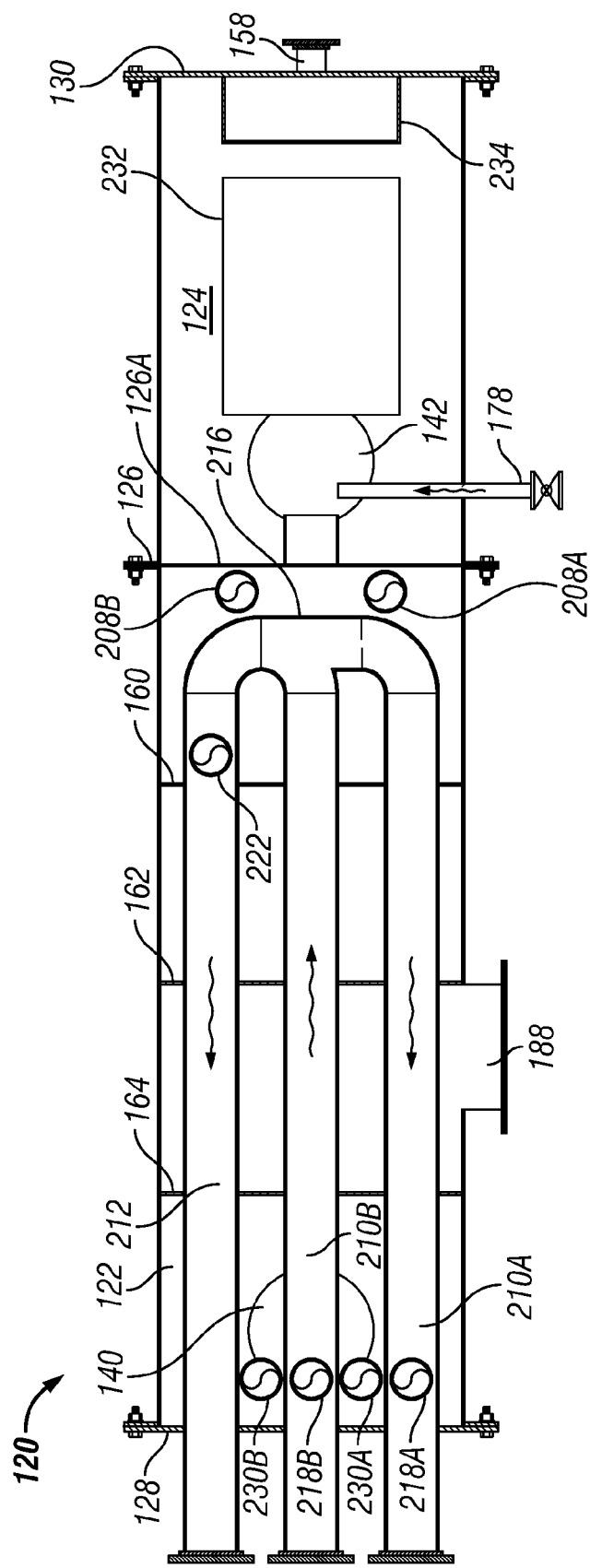
FIG. 7 is a schematic sectional view of the emulsion treater of FIG. 5 as seen along the lines 7-7 according to an embodiment of the invention.
Figure 8:
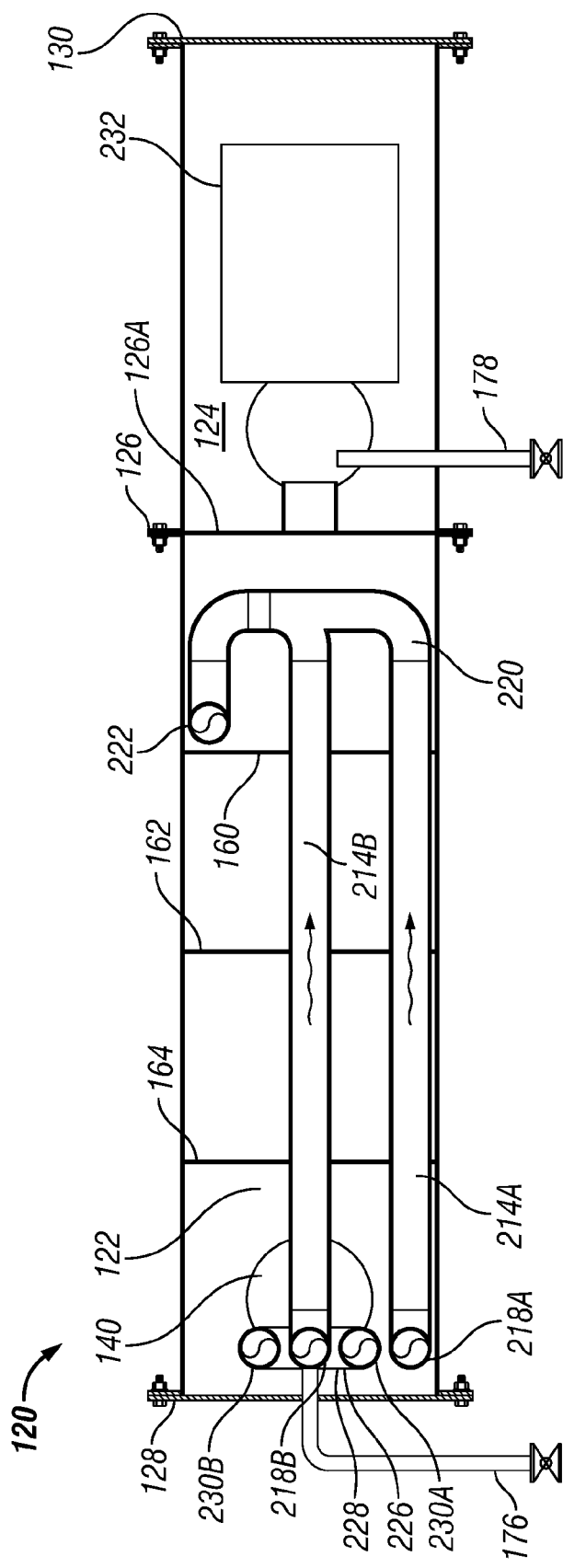
FIG. 8 is a schematic sectional view of the emulsion treater of FIG. 5 as seen along the lines 8-8 according to an embodiment of the invention.
Figure 9:
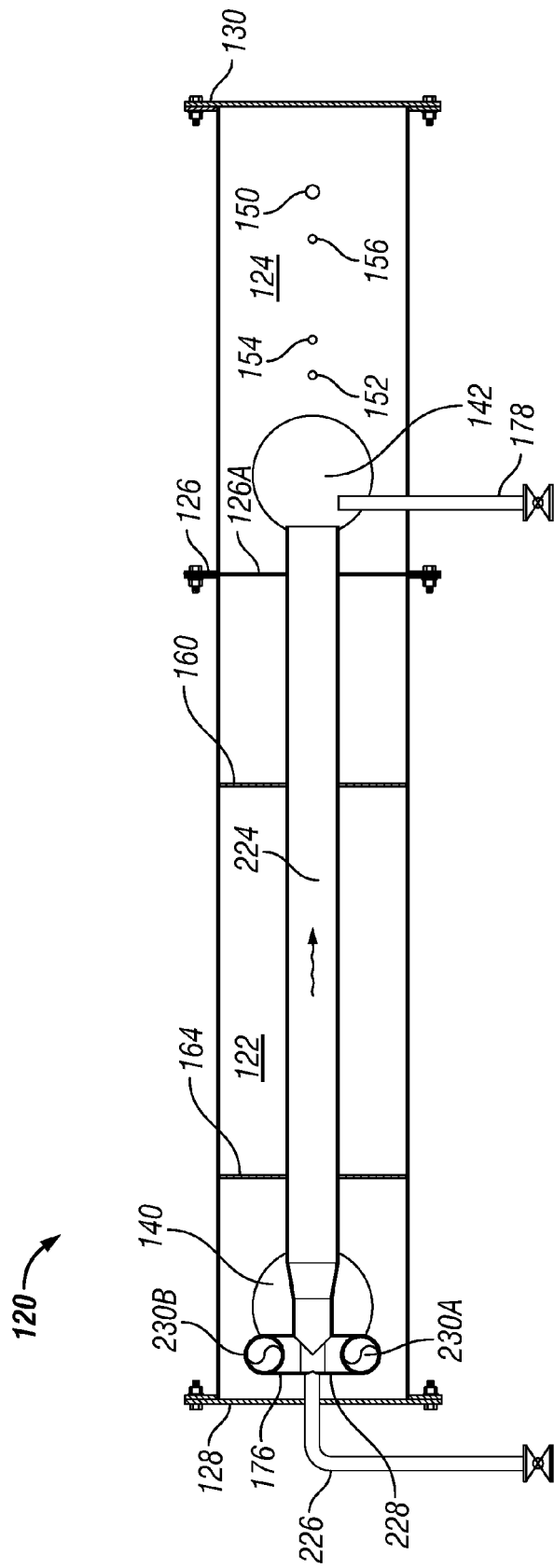
FIG. 9 is a schematic sectional view of the emulsion treater of FIG. 5 as seen along the lines 9-9 according to an embodiment of the invention.

FIG. 3 is an end elevation of the treater 120, and shows a side mounted manway 188 for added access to the primary section 122, which is also seen in FIGS. 6 and 7.

Figure 4:
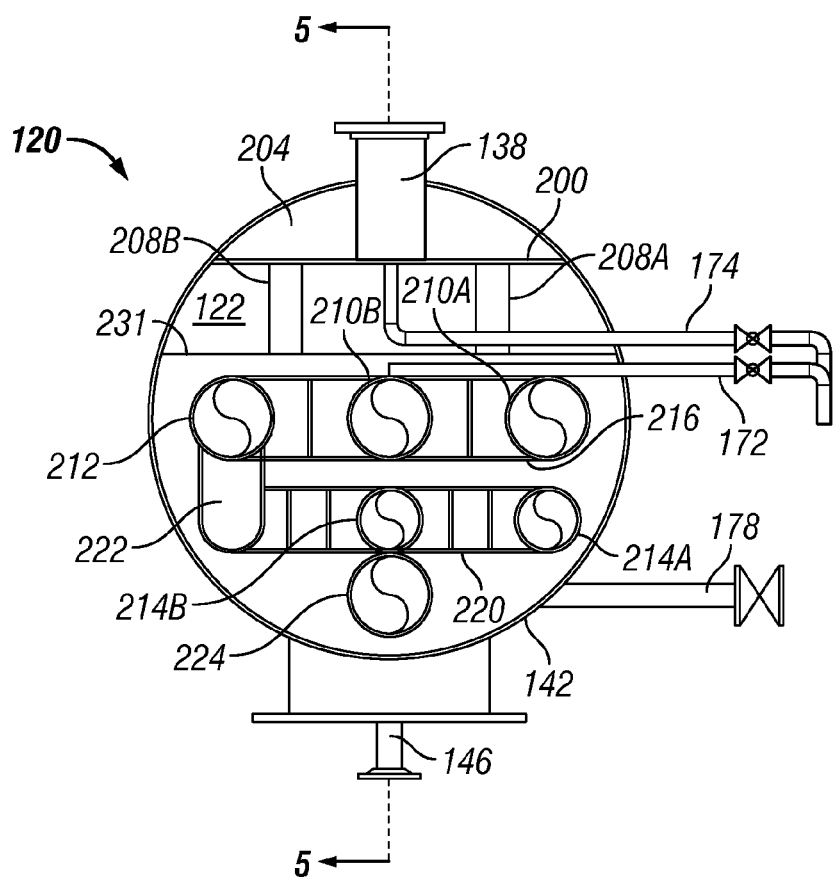
FIG. 4 is a schematic cross sectional view of the emulsion treater of FIG. 2 as seen along the lines 4-4 according to an embodiment of the invention.
Figure 5:
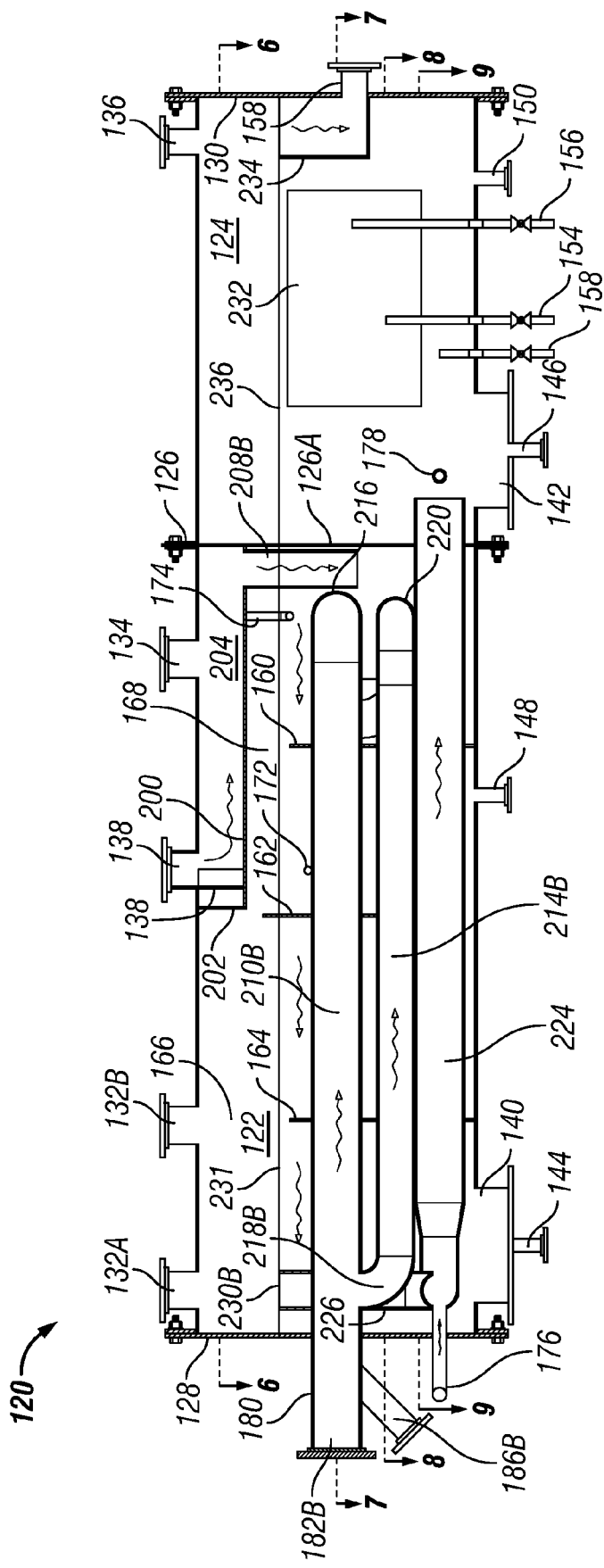
FIG. 5 is a schematic longitudinal sectional view of the emulsion treater of FIG. 4 as seen along the lines 5-5 according to an embodiment of the invention.

FIG. 4 is a schematic transverse sectional view, and FIG. 5 a longitudinal sectional view, of the emulsion treater unit 120 according to an embodiment of the invention, showing an overview of the unit 120 internals. A horizontal plate 200 and a vertical plate 202 opposite the partition 126A, define an emulsion inlet chamber 204 at the top of the primary section 122 to one side adjacent the flanged connection 126. The emulsion inlet 138 is in communication with the inlet chamber 204, and can be provided with a distributor 206 to evenly distribute the emulsion feed. The plates 200, 202 can provide heat transfer into the chamber 204, and any vapor generated within the chamber can be vented to vapor outlet 134, e.g. to a condenser/separator to recover volatile hydrocarbons and/or water condensate. Water and/or hydrocarbon vapors condensed at the plates 200, 202 can reflux to the vapor-liquid interface 231, and readily separate into the respective oil and water layers due to density differences. Any condensate forming in the vapor space is, of course, free of solids which might otherwise stabilize an emulsion, and can also help maintain subcooling at the vapor-liquid interface. The emulsion drains from the chamber 204 via downcomers 208A, 208B, which as seen in FIGS. 5-8, are adjacent the partition 126A to introduce the emulsion feed there.

The internals of the firetube assembly 180, in one embodiment as best seen in FIGS. 4, 5, 7 and 8, comprise a plurality of longitudinally oriented pipes 210A, 210B, 212, 214A and 214B, arranged in an upper bank and a lower bank. The upper tube bank includes generally larger pipes 210A, 210B, 212 than the lower tube bank, and the lower tube bank pipes 214A, 214B are preferably located directly beneath within the plan of the pipes 210A, 210B, respectively. The pipes 210A, 210B receive hot gas from the respective nozzles 182A, 182B, which is collected in and passed through the upper manifold 216 into the return pipe 212 and out the nozzle 184.

The pipes 214A, 214B are connected to receive split streams from the upper pipes 210A, 210B at respective supply elbows 218A, 218B, which are collected and returned through manifold 220 and return elbow 222 into the return pipe 212. The elbows 218A, 218B are located adjacent the flange 128 in one embodiment. The manifolds 216, 220 have a similar plan, e.g. an elbow at the end of the pipes 210A, 214A connected to a U-bend at the ends of the pipes 210B, 212 and of the pipe 214B and return elbow 222. Thus, the return elbow 222 in one embodiment is located adjacent the manifolds 216, 220 and provides structural rigidity to the firetube assembly 180 to maintain the spacing and alignment of the pipes 210A, 210B, 212, 214A and 214B at the manifolds 216, 220. The baffles 160, 162, 164 are also perforated to allow the pipes 210A, 210B, 212, 214A and 214B to pass through and also serve to maintain spacing and alignment.

The oil transfer pipe 224 receives overflow via the drain assembly 226 comprised of the U-bend 228 and upright drain pipes 230A, 230B disposed adjacent the flange 128. The height of the drain pipes 230A, 230B determines the level of the vapor-liquid interface 231 in primary section 122. In an embodiment the drain pipe 230A is disposed between the pipes 210A, 214A on the outside and pipes 210B, 214B in the middle, while the drain pipe 230B is disposed between the pipe 212 on the outside and pipes 210B, 214B in the middle. The open upper ends of the drain pipes 230A, 230B extend above the height of the upper bank of pipes 210A, 210B, 212, and in one embodiment also extend above the height of the overflow baffles 160, 164, but below the height of the underflow baffle 162 and below the height of the plate 200 at the bottom of the inlet chamber 204. The oil transfer pipe is connect at one end to the U-bend 228, passes through an aperture in the partition 126A and into the secondary section 124.

The secondary section 124 in one embodiment serves to separate additional water from the oil layer received via the transfer pipe 224. In an embodiment, a water treatment chemical such as a coagulant or flocculant to facilitate removal of solids, for example, water glass, alum salts, polyelectrolytes, etc., can be injected via port 178 or port 182 or the like. In another embodiment, which can be in addition to or alternatively to the chemical addition, an electrocoagulator 232 can be disposed in the secondary section 124. The use of water treatment chemicals and/or electrocoagulation in the secondary section can have the benefit of requiring a lesser extents of treatment since much of the water from the emulsion feed has previously been removed in the primary section, and treatment is only required for the residual water phase in the oil-rich layer transferred from the primary section to the secondary section. Water-lean oil overflows weir 234 to the oil outlet 158. The height of the weir 234 determines the level of the vapor-liquid interface 236 in primary section 122. In one embodiment, the height of the weir 234 is the same as the height of the upper ends of the drain pipes 230A, 230B.

Figure 10:
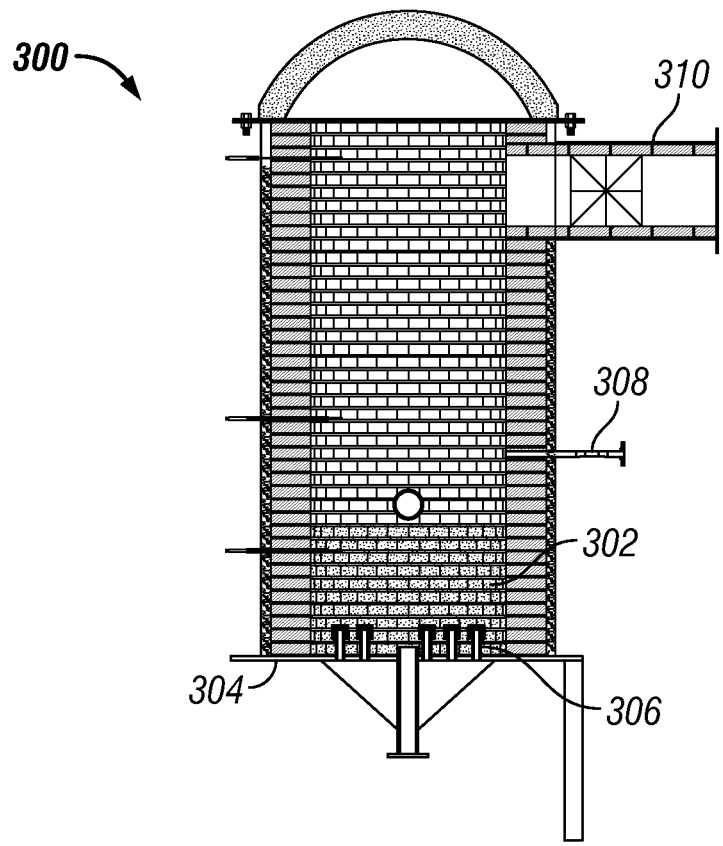
FIG. 10 is a side elevation of a pyrolysis unit according to an embodiment of the invention.
Figure 11:
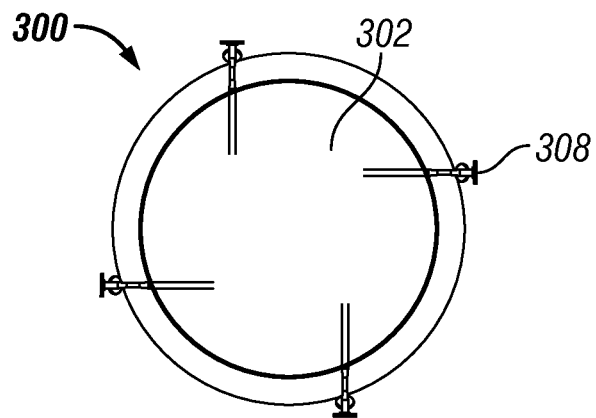
FIG. 11 is a plan view of the pyrolysis unit of FIG. 10 according to an embodiment of the invention.

With reference to FIGS. 10 and 11, the pyrolysis unit 300 in one embodiment has a bed 302 of solids such as silica sand supported on a lower tray 304 and fluidized by oxygen-containing gas such as air, oxygen or oxygen-enriched air introduced through fluidizing nozzles 306 distributed along the tray 304. The solids in the bed 302 are kept hot by partial oxidation or combustion of hydrocarbons in the emulsion or oil introduced onto the bed 302 via injection nozzles 308 optionally with an atomization gas, which can be an oxygen-containing gas such as air or oxygen-enriched air. The nozzles 308 can be arrayed radially in an embodiment and introduce the oil/air mixture tangentially to induce a cyclonic flow pattern within the unit 300 which is thought to, but not required to minimize solids entrainment and facilitate solids disengagement from the effluent gas, which exits via refractory-lined pipe 310 to the firetube assembly of the emulsion treater as described in various embodiments above.

In one embodiment, lime can be continuously or periodically added to the fluidized bed 302 as a solid feed or slurry, and can be helpful to absorb sulfur compounds and control the level of sulfur in the stack gases. In one embodiment, fresh makeup solids can be continuously or periodically added to the fluidized bed 302, and can be helpful to make up for attrition losses. In one embodiment, solids can be continuously or periodically withdrawn from the bed 302, and can be helpful to maintain inventory levels where solids are introduced with the emulsion or other oil-containing feedstock. In one embodiment, a supplemental burner/blower can supply air and fuel such as diesel to the unit, and can be helpful to heat the unit 300 at startup or during process upsets where the supply of emulsion/oil feedstock is insufficient to maintain the desired temperature.

The emulsion treater unit and pyrolysis unit of the embodiments described herein can conveniently be located where waste oil emulsions is delivered either by tank truck or collected by short pipeline from oil patch sites. After optional temporary tank or pond storage, to allow settling of solids and partial gravity separation of oil and water, the emulsion can be fed to the pyrolysis unit in an embodiment, which will be preheated to a selected operating temperature, between 500° C. and 1200° C., depending on the intended application and the petroleum fractions present in the emulsion, by initial firing with wood, oil or gas, as available.

When the emulsion enters the pyrolysis unit, the following reactions can take place in various embodiments, each dominating with increasing temperature or air-to-fuel ratio, in the sequence shown:

Distillation→Pyrolysis (Cracking)→Gasification→Combustion

In distillation, volatile components, starting with water and light hydrocarbons, vaporize and are available for recovery by condensation. This reaction is endothermic, requiring heat. In pyrolysis, heavier, less volatile hydrocarbons are thermally ruptured, producing light gases and still heavier residues or coke. This reaction is endothermic, requiring heat. In gasification, residual coke, nearly-pure carbon, reacts with remaining steam and hydrogen, as follows:

C+H2O→H2+CO

C+2H2→CH4

These reactions are strongly endothermic, requiring heat produced by combustion, and reducing the overall thermal efficiency of the process. It is also the slowest of the reactions, determining the residence volume required, if it is desired to consume all or substantially all of the remaining carbon. The reaction occurs when the ratio of air to hydrocarbons is well below the stoichiometric ratio required for complete combustion, and the water-to-oil ratio is high. This reaction is also promoted by the presence of sodium or other alkaline minerals, such as salt which occurs in brine emulsions. Compared with simple near-dry incineration or re-distillation of waste oil, one embodiment of this invention can take advantage of the accompanying water or brine to enhance the production of useful fuel gas.

In combustion, any remaining coke is burned. The reaction is strongly exothermic, providing all the heat to sustain the above reactions, plus a surplus to be recovered or used in the secondary, brine-drying vessel. All of the above reactions are competing with combustion, and some or all of their products may be burned to provide the heat required.

The relative dominance of these reactions is determined by the air-to-fuel ratio. Where recovery of useful petroleum fractions is the dominant objective, operation is at relative low temperatures, which are determined by the boiling points of the available and desired products. This leaves light combustible vapors in the raw product gas, available as a fuel source. In one embodiment, a higher temperature, up to 1200° C. is achieved, by maximum air flow, which results in complete or nearly complete combustion, where the product gas consists essentially of $N_2$, $CO_2$ and steam with only residual amounts of hydrocarbon species and/or CO.

One embodiment of this invention, using the process/components shown in FIGS. 1A-1B, hot product gas, containing some combustible gases and vapors, proceeds to the firetube assembly 40, where it provides heat to the emulsion in the heating chamber 28 of the treater unit 14. In one embodiment, a catalytic reactor or afterburner (not shown) can be disposed in the effluent pipe 76 and/or the firetube assembly 40 to further oxidize any CO, with or without additional oxygen-containing gas injection, and elevate the temperature of the effluent gas. In one embodiment, the cooled effluent gas from the firetube assembly 40, after being cooled and exiting the treater unit 14, is processed as a stack gas in line 99. In another embodiment, the cooled effluent in line 99 comprises a low heating value fuel gas which can be burned as a fuel.

Preliminary pilot plant tests have suggested that a typical emulsion of 15 wt % crude oil can be over 90% consumed by use of enough air to raise the fluid bed temperature and gas leaving the top of the vessel 72 to 1000° C. or greater. The elemental composition of the crude petroleum in this example $(C_{83}H_{11}(N+O)_{1.7}S_{4.3})$ provides a heating value of approximately 80,400 kcal/kg, and 90%+combustion of 15% oil in the emulsion, after deducting the heat required to vaporize the 85% water at 1000° C., provides enough heat to heat the treater unit 14 for the purpose of separating the emulsion into oil and water layers.

The pyrolysis unit 72 (FIG. 1B) or 300 (FIGS. 10-11) in an embodiment is thus an insulated, refractory-lined furnace, where combustion and other reactions can occur in a fluidized bed of hot particulates such as silica sand, preferably in the lower 3 or 4 meters of the vessel. The emulsion feed or other hydrocarbonaceous feedstock such as oil fractionated from the emulsion, is injected into the fluidized sand bed, well below its surface, preferably via a distribution system such as at a plurality of locations radially spaced around the periphery, for example, 4 or more points. Where injection nozzles are employed, they are aimed into the fluidized bed in a way to maximize quick, uniform distribution, for more efficient mixing, and to avoid chilling of the bed in cold spots. The vessel can also have feed chutes for introducing make-up sand, to replace sand drawn out the bottom for separation of ash or dust, and reclamation of the clean sand. The vessel can also include a feed chute for injection of dry lime into the fluidized bed, or to capture sulfur compounds. The spent lime, as gypsum, $CaSO_3$ and/or $CaSO_4$, depending on the oxygen level in the bed with sand, can be separated externally for disposal. The sand can be drained from the bottom of the fluidized bed by a pipe to a screw conveyor, which regulates the rate of sand extraction.

Accordingly, the invention provides various method or process embodiments, as well as various apparatus, equipment or system embodiments, each separately enumerated below, wherein the term "comprising" is to be construed broadly as an open-ended term requiring the presence of at least one of each of the features specified but permitting the presence of other features not specified. Some of the method or process embodiments are as follows:

1. A process, comprising:
   heating an emulsion in a subcooled boiling zone, wherein the boiling zone is atmospherically vented;
   recovering an oil-rich layer from adjacent a vapor-liquid interface; and
   recovering an aqueous-rich layer from below the oil-rich layer.
2. The process of the preceding embodiment, wherein the boiling zone comprises a heat transfer surface having a temperature in excess of the saturation temperature of the aqueous-rich layer, and wherein the vapor-liquid interface is subcooled with respect to the aqueous layer.
3. The process of any one of the previous embodiments wherein the oil-rich layer is recovered as an overflow stream.
4. The process of any one of the previous embodiments wherein the heat transfer surface is maintained at a temperature above 100° C., 105° C., 110° C., 125° C. or 150° C.
5. The process of any one of the previous embodiments wherein the vapor-liquid interface is maintained at a maximum temperature of 105° C., 104° C., 103° C., 102° C., 101° C. or 100° C., at a minimum temperature of 95° C., 96° C., 97° C., 98° C., 99° C. or 100° C., or within a range from any one of the minimum temperatures to any higher one of the maximum temperatures.
6. The process of any one of the previous embodiments, comprising a subcritical heat flux at the heat transfer surface for nucleate boiling.
7. The process of any one of the previous embodiments wherein the emulsion comprises a solids-stabilized emulsion.
8. The process of any one of the previous embodiments wherein the emulsion comprises clay particles.
9. The process of any one of the previous embodiments wherein the emulsion comprises oilfield sludge.
10. The process of any one of the previous embodiments wherein the emulsion comprises refinery sludge.
11. The process of any one of the previous embodiments wherein the emulsion comprises from 30 to 70 wt % oil and from 70 to 30 wt % water, by total weight of the oil and water.
12. The process of any one of the previous embodiments wherein the emulsion comprises from 0.1 up to 20 wt % solids, by total weight of the emulsion.
13. The process of any one of the previous embodiments wherein the emulsion comprises from 0.1 up to 20 wt % clay particles, by total weight of the emulsion.
14. The process of any one of the previous embodiments wherein the oil-rich layer is solids-lean.
15. The process of any one of the previous embodiments wherein the aqueous-rich layer is solids rich.
16. The process of any one of the previous embodiments wherein the vapor at the vapor-liquid interface is saturated or subcooled.
17. The process of any one of the previous embodiments comprising maintaining a gauge pressure at the vapor-liquid interface less than 200 kPa.
18. The process of any one of the previous embodiments comprising maintaining a gauge pressure at the vapor-liquid interface less than 100 kPa.
19. The process of any one of the previous embodiments comprising maintaining a gauge pressure at the vapor-liquid interface less than 50 kPa.
20. The process of any one of the previous embodiments comprising maintaining a gauge pressure at the vapor-liquid interface less than 20 kPa.
21. The process of any one of the previous embodiments comprising maintaining a gauge pressure at the vapor-liquid interface less than 10 kPa.
22. The process of any one of the previous embodiments wherein a partial pressure of water vapor at the vapor-liquid interface is less than one atmosphere absolute.
23. The process of any one of the previous embodiments wherein the heating and separation are effected in a vessel maintained essentially at atmospheric pressure.
24. The process of any one of the previous embodiments comprising venting a vapor space to atmospheric pressure.
25. The process of any one of the previous embodiments comprising venting a vapor space to a condenser.
26. The process of the immediately preceding embodiment wherein the condenser is operated at essentially atmospheric pressure.
27. The process of either one of the two immediately preceding embodiments comprising collecting condensate from the condenser.
28. The process of the immediately preceding embodiment comprising separating the condensate from the condenser to recover oil condensate and aqueous condensate streams.
29. The process of any one of the previous embodiments wherein less than 10 percent of the water in the emulsion is vaporized across the vapor-liquid interface.
30. The process of any one of the previous embodiments wherein less than 3 percent of the water in the emulsion is vaporized across the vapor-liquid interface.
31. The process of any one of the previous embodiments wherein less than 1 percent of the water in the emulsion is vaporized across the vapor-liquid interface.
32. The process of any one of the previous embodiments wherein less than 0.1 percent of the water in the emulsion is vaporized across the vapor-liquid interface.
33. The process of any one of the previous embodiments comprising indirectly heating the heat transfer surface with relatively hot gas.
34. The process of any one of the previous embodiments comprising supplying relatively hot gas within a tube submerged in the oil-rich layer below the vapor liquid interface.
35. The process of either one of the two immediately preceding embodiments wherein the hot gas have a temperature in the heating tube from 400 C to 1200 C.
36. The process of any one of the three immediately preceding embodiments wherein the hot gas has an inlet temperature of at least 800 C.
37. The process of any one of the four immediately preceding embodiments wherein the hot gas has an outlet temperature from 400 to 600 C
38. The process of any one of the previous embodiments comprising supplying relatively hot gas within a tube submerged in the oil-rich layer below the vapor liquid interface wherein the tube is disposed adjacent an inlet to an overflow tube.
39. The process of any one of the previous embodiments comprising supplying relatively hot gas within a tube submerged in the oil-rich layer below the vapor liquid interface and disposed above the aqueous rich layer.
40. The process of either one of the two immediately preceding embodiments wherein the hot gas is continuously supplied at a rate and a temperature sufficient to maintain the temperature of the outside heat transfer surface (in contact with the emulsion) above the boiling point of the aqueous layer.
41. The process of any one of the previous embodiments wherein the emulsion is continuously supplied to the boiling zone at a rate and a temperature sufficient to maintain a bulk fluid temperature below the saturation temperature of the aqueous layer.
42. The process of any one of the previous embodiments wherein the bulk fluid temperature at the vapor-liquid interface effectively inhibits steam generation from the vapor-liquid interface.
43. The process of any one of the previous embodiments comprising indirectly heating the heat transfer surface with relatively hot gas wherein the hot gas comprises hydrocarbon combustion effluent.
44. The process of the immediately preceding embodiment comprising oxidizing emulsion to form the combustion effluent.
45. The process of either one of the two immediately preceding embodiments comprising oxidizing a first fraction of an emulsion feedstock to form the combustion effluent and supplying a second fraction of the emulsion feedstock to the heating.
46. The process of the immediately preceding embodiment wherein a weight ratio of the first fraction to the second fraction is from 1:100 to 20:100.
47. The process of any one of the three immediately preceding embodiments wherein the oxidation comprises introducing the first fraction of the emulsion into a fluidized bed of solids with an oxygen-containing gas.
48. The process of the immediately preceding embodiment wherein the emulsion is atomized with the oxygen-containing gas.
49. The process of either of the two immediately preceding embodiments wherein the fluidized bed of solids comprises silica sand.
50. The process of any one of the three immediately preceding embodiments wherein makeup solids are fed into the bed.
51. The process of any one of the four immediately preceding embodiments wherein spent solids are continuously or periodically withdrawn from the bed.
52. The process of any one of the five immediately preceding embodiments wherein lime is added to the bed of solids.
53. The process of the immediately preceding embodiment wherein the lime addition is in an amount effective to absorb sulfur and thereby provide a sulfur-lean effluent gas.
54. The process of any one of the eight immediately preceding embodiments wherein the oxidation produces CO in a first oxidation stage and in a second oxidation stage the CO is converted to CO2.
55. The process of the immediately preceding embodiment wherein the second oxidation stage comprises a catalytic converter to which a supplemental oxygen-containing gas is supplied.
56. The process of any one of the previous embodiments comprising pretreating an emulsion feedstock to obtain a pretreated emulsion for the heating, wherein the pretreated emulsion has a lower water content relative to the emulsion feedstock.
57. The process of the immediately preceding embodiment wherein the pretreating comprises gravity separation at ambient temperature or at a temperature less than that of the boiling zone.
58. The process of any one of the previous embodiments, comprising preheating the emulsion in indirect heat exchange with a vapor chamber above the vapor-liquid interface.
59. The process of the immediately preceding embodiment comprising refluxing condensate from a cooling surface in the vapor chamber to the boiling zone.
60. The process of any one of the previous embodiments further comprising transferring the recovered oil-rich layer from the boiling zone to a secondary separation stage, recovering a water-lean oil stream from the secondary separation stage, and recovering an oil-lean aqueous stream from the secondary separation stage.

Some of the apparatus, equipment or system embodiments are as follows:
1. An emulsion treater, comprising:
   a subcooled boiling zone comprising a heat transfer surface in contact with an emulsion at a temperature in excess of the saturation temperature of an aqueous phase in the emulsion, wherein the boiling zone is atmospherically vented;
   a line to recover an oil-rich layer from adjacent a vapor-liquid interface; and
   a line to recover an aqueous-rich layer from below the oil-rich layer.
2. An emulsion treater used for treating an emulsion according to the process of any one of the above-enumerated process embodiments 1 to 60, comprising:
   means for heating an emulsion in a subcooled boiling zone, wherein the boiling zone is atmospherically vented;
   means for recovering an oil-rich layer from adjacent a vapor-liquid interface; and
   means for recovering an aqueous-rich layer from below the oil-rich layer.
3. The emulsion treater according to any one of the preceding embodiments, comprising a flow control system to heat a heat transfer surface in the boiling zone to a temperature in excess of the saturation temperature of the aqueous-rich layer, and to maintain subcooling at the vapor-liquid interface with respect to the aqueous layer.
4. The emulsion treater according to any one of the preceding embodiments, wherein the temperature of the heat transfer surface is above 100° C., 105° C., 110° C., 125° C. or 150° C.
5. The emulsion treater according to any one of the preceding embodiments, wherein the vapor-liquid interface has a maximum temperature of 105° C., 104° C., 103° C., 102° C., 101° C. or 100° C., a minimum temperature of 95° C., 96° C., 97° C., 98° C., 99° C. or 100° C., or a temperature within a range from any one of the minimum temperatures to any higher one of the maximum temperatures.
6. The emulsion treater according to any one of the preceding embodiments, comprising a subcritical heat flux at the heat transfer surface for nucleate boiling.
7. The emulsion treater according to any one of the preceding embodiments, wherein the emulsion comprises a solids-stabilized emulsion.
8. The emulsion treater according to any one of the preceding embodiments, wherein the emulsion comprises clay particles.
9. The emulsion treater according to any one of the preceding embodiments, wherein the emulsion comprises oilfield sludge.
10. The emulsion treater according to any one of the preceding embodiments, wherein the emulsion comprises refinery sludge.

11. The emulsion treater according to any one of the preceding embodiments, wherein the emulsion comprises from 30 to 70 wt % oil and from 70 to 30 wt % water, by total weight of the oil and water.
12. The emulsion treater according to any one of the preceding embodiments, wherein the emulsion comprises from 0.1 up to 20 wt % solids, by total weight of the emulsion.
13. The emulsion treater according to any one of the preceding embodiments, wherein the emulsion comprises from 0.1 up to 20 wt % clay particles, by total weight of the emulsion.
14. The emulsion treater according to any one of the preceding embodiments, wherein the oil-rich layer is solids-lean.
15. The emulsion treater according to any one of the preceding embodiments, wherein the aqueous-rich layer is solids rich.
16. The emulsion treater according to any one of the preceding embodiments, comprising a vent line to maintain a gauge pressure at the vapor-liquid interface less than 200 kPa, less than 100 kPa, less than 50 kPa, less than 20 kPa, or less than 10 kPa.
17. The emulsion treater according to any one of the preceding embodiments, comprising a vent line to maintain a partial pressure of water vapor at the vapor-liquid interface less than one atmosphere absolute.
18. The emulsion treater according to any one of the preceding embodiments, wherein the boiling zone is disposed in an atmospheric or essentially atmospheric vessel.
19. The emulsion treater according to any one of the preceding embodiments, comprising a vent line from a vapor space to a condenser.
20. The emulsion treater according to the immediately preceding embodiment, wherein the condenser is vented to atmospheric pressure.
21. The emulsion treater according to any one of the two immediately preceding embodiments, comprising a separator to receive and separate the condensate from the condenser to recover oil condensate and aqueous condensate streams.
22. The emulsion treater according to any one of the preceding embodiments, comprising a furnace to indirectly heat the heat transfer surface with relatively hot gas at a temperature from 400° C. to 1200° C., preferably at least 800° C.
23. The emulsion treater according to any one of the preceding embodiments, comprising a firetube submerged in the oil-rich layer below the vapor liquid interface.
24. The emulsion treater according to the immediately preceding embodiment, wherein the firetube comprises an assembly of a plurality of horizontal tubes.
25. The emulsion treater according to the immediately preceding embodiment, wherein the firetube assembly comprises an inlet manifold to distribute a hot gas supply into a plurality of supply tubes.
26. The emulsion treater according to the immediately preceding embodiment, wherein the firetube assembly further comprises a return manifold to collect the hot gas from the plurality of supply tubes into a return tube.
27. The emulsion treater according to any one of the three immediately preceding embodiments, wherein the plurality of tubes are arrayed in a plurality of rows and columns.
28. The emulsion treater according to the immediately preceding embodiment, wherein the tubes in each column are vertically aligned.
29. The emulsion treater according to the immediately preceding embodiment, wherein the columns are laterally spaced apart.
30. The emulsion treater according to the immediately preceding embodiment, comprising upright drain pipes disposed in the lateral spacing between the columns.
31. The emulsion treater according to any one of the four immediately preceding embodiments, comprising an oil transfer pipe disposed below the firetube assembly to remove the oil-rich layer, wherein the oil transfer pipe is aligned with one of the columns.
32. The emulsion treater according to any one of the five immediately preceding embodiments, wherein the rows are horizontally aligned.
33. The emulsion treater according to any one of the ten immediately preceding embodiments, comprising baffles disposed transversely to the horizontal tubes of the firetube assembly for liquid crossflow outside the horizontal tubes.
34. The emulsion treater of any one of the previous embodiments, comprising an emulsion preheating chamber in indirect heat exchange with a vapor space above the vapor-liquid interface.
35. The emulsion treater of the immediately preceding embodiment, further comprising a reflux path for condensate from a cooling surface in the vapor space to the boiling zone.
36. The emulsion treater of any one of the two immediately preceding embodiments, further comprising an atmospheric vent from the emulsion preheating chamber.
37. The emulsion treater of any one of the three immediately preceding embodiments, further comprising an emulsion downcomer from the emulsion preheating chamber into the boiling zone.
38. The emulsion treater according to any one of the preceding embodiments, wherein the boiling zone comprises:
   a horizontally elongated tank with an emulsion inlet zone adjacent one end and an overflow at the opposite end zone into the oil-rich layer recovery line;
   a plurality of longitudinal heat transfer surfaces below the vapor-liquid interface;
   a liquid flow path from the emulsion inlet zone to the overflow zone; and
   a bottoms drain into the aqueous-rich layer recovery line.
39. The emulsion treater of the immediately preceding embodiment, comprising a plurality of transverse baffles in the boiling zone for liquid crossflow against the plurality of longitudinal heat transfer surfaces.
40. The emulsion treater of the immediately preceding embodiment, wherein the baffles define liquid flow windows alternated above and below the baffles.
41. The emulsion treater according to any one of the preceding embodiments, further comprising:
   a secondary settling chamber to receive the oil-rich layer;
   an overflow line from the secondary settling chamber to recover a water-lean layer; and
   a line to recover an oil-lean layer from below the water-lean layer.
42. The emulsion treater of the immediately preceding embodiment, further comprising an injection line into the secondary settling chamber for water treatment chemicals.
43. The emulsion treater of either one of the two immediately preceding embodiments, further comprising an electrocoagulator in the secondary settling chamber.
44. The emulsion treater of any one of the three immediately preceding embodiments, comprising a horizontally elongated vessel housing the boiling zone and the secondary settling chamber and a partition wall between the boiling zone and the secondary settling chamber.

45. The emulsion treater of the immediately preceding embodiment, wherein an emulsion inlet to the boiling zone is disposed adjacent the partition wall.
46. The emulsion treater of either one of the two immediately preceding embodiments, wherein an inlet for the oil-rich layer to the secondary settling chamber is disposed adjacent the partition wall.
47. The emulsion treater of either one of the three immediately preceding embodiments, wherein the partition wall is thermally conductive for indirect heat transfer between the boiling zone and the secondary settling chamber.
48. The emulsion treater of any one of the seven immediately preceding embodiments, further comprising an atmospheric vent from the secondary settling chamber.
49. The emulsion treater of any one of the preceding embodiments, comprising a pretreater for an emulsion feedstock to obtain a pretreated emulsion feed to the boiling zone, wherein the pretreated emulsion feed has a lower water content relative to the emulsion feedstock.
50. The emulsion treater of the immediately preceding embodiment, wherein the pretreater comprises a gravity separator.
51. The emulsion treater of either one of the two immediately preceding embodiments, wherein the pretreater comprises a centrifuge.
52. An emulsion treater optionally according to any one of the preceding embodiments, comprising:
   a horizontally elongated vessel with a partition wall between a primary chamber and a secondary chamber;
   wherein the primary chamber comprises:
      a subcooled boiling zone;
      a first vapor space;
      an atmospheric vent in communication with the vapor space;
      a vapor-liquid interface between the boiling zone and the vapor space;
      a preheating chamber in indirect heat exchange relationship with the vapor space and spaced above the vapor-liquid interface;
      a downcomer for emulsion from the preheating chamber into the boiling zone adjacent the partition wall;
      an overflow assembly at a first end of the vessel opposite the partition wall to drain an oil-rich layer from adjacent the vapor-liquid interface into an oil transfer pipe disposed adjacent a bottom of the primary chamber;
      a primary bottoms drain to recover an aqueous-rich layer from the primary chamber;
      a firetube assembly disposed below the vapor liquid interface comprising a plurality of longitudinal tubes with external heat transfer surfaces;
      a liquid flow path from the downcomer through the boiling zone across the plurality of longitudinal tubes to the overflow assembly;
   wherein the secondary chamber comprises:
      an inlet zone adjacent the partition wall to receive the oil-rich layer from an end of the oil transfer pipe;
      an overflow weir at a second end of the vessel opposite the partition wall to drain an aqueous-lean layer from an upper liquid surface in the secondary chamber;
      a secondary bottoms drain to recover an aqueous-rich layer from the secondary chamber;
      a flow path from the inlet zone through the secondary chamber to the overflow weir.
53. The emulsion treater of the immediately preceding embodiment, wherein the vessel is mounted on a transportable skid.
54. The emulsion treater of any one of the two immediately preceding embodiments, wherein the vessel comprises a horizontal cylindrical tank.
55. The emulsion treater of any one of the three immediately preceding embodiments, wherein the partition wall forms a fluid seal between the primary and secondary chambers, and the oil transfer pipe passes through the partition wall to hydraulically couple the overflow assembly of the primary chamber to the inlet zone of the secondary chamber.
56. The emulsion treater of any one of the four immediately preceding embodiments, wherein the inlet zone is disposed adjacent a bottom of the secondary chamber.
57. The emulsion treater of any one of the five immediately preceding embodiments, further comprising baffles disposed in the boiling zone for liquid crossflow across the tubes.
58. The emulsion treater of any one of the six immediately preceding embodiments, further comprising a hot gas manifold at the first end of the vessel to supply hot gas to the firetube assembly.
59. The emulsion treater of any one of the seven immediately preceding embodiments, further comprising an atmospheric vent from a vapor space in the preheat chamber.
60. The emulsion treater of any one of the seven immediately preceding embodiments, further comprising an atmospheric vent from a vapor space in secondary chamber.
61. The emulsion treater of any one of the eight immediately preceding embodiments, further comprising a flow control system to control the rate of continuous emulsion feed to the preheating chamber relative to hot gas continuously supplied to the firetube assembly to maintain the external heat transfer surfaces of the firetube assembly at a temperature in excess of the boiling point of the aqueous phase while maintaining subcooling conditions in the primary chamber to vaporize less than 1 percent of the water in the emulsion feed.

The invention will now be more particularly described with reference to the following non-limiting example. The treating unit comprises a horizontal cylindrical tank with an overall length of 5486 mm (18 ft) and a diameter of 1220 mm (4 ft). The heating chamber has a length of 3500 mm (11.5 ft) and a distance from the partition wall to the centerline of the return U bend in the firetubes is 310 mm (1.0 ft). The fire tubes are 200 mm (8-in.) and/or 150 mm (6-in.) diameter.

The preceding description has been presented with reference to presently preferred embodiments of the invention. Persons skilled in the art and technology to which this invention pertains will appreciate that alterations and changes in the described compositions and methods can be practiced without meaningfully departing from the principle, and scope of this invention. Accordingly, the foregoing description should not be read as pertaining only to the exact embodiments described and shown in the accompanying drawings, but rather should be read as consistent with and as support for the following claims, which are to have their fullest and fairest scope.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention.

What I claim is:

1. A process, comprising:
operating a treating unit to heat an emulsion in a subcooled boiling zone, wherein the boiling zone is atmospherically vented, wherein the treating unit comprises:
 a heat transfer surface to contact the emulsion at a temperature in excess of the saturation temperature of an aqueous phase in the emulsion, wherein a bulk fluid temperature in the subcooled boiling zone is below the saturation temperature of the aqueous phase of the emulsion;
 a line to recover an oil-rich layer from adjacent a vapor-liquid interface; and
 a line to recover an aqueous-rich layer from below the oil-rich layer;
recovering the oil-rich layer from adjacent the vapor-liquid interface;
recovering the aqueous-rich layer from below the oil-rich layer;
indirectly heating the heat transfer surface with hot gas at a temperature from 400° C. to 1200° C. within a tube submerged in the oil-rich layer below the vapor liquid interface; and
oxidizing a first fraction of an emulsion feedstock in a fluidized bed of solids with an oxygen-containing gas to form the hot gas, and supplying a second fraction of the emulsion feedstock to the heating, wherein a weight ratio of the first fraction to the second fraction is from 1:100 to 20:100.

2. The process of claim 1, the treating unit comprising a vent line from a vapor space to a condenser.

3. The process of claim 1, the treating unit comprising a firetube submerged in the oil-rich layer below the vapor liquid interface, wherein the firetube comprises an assembly of a plurality of horizontal tubes.

4. The process of claim 1, the treating unit comprising an emulsion preheating chamber in indirect heat exchange with a vapor space above the vapor-liquid interface, and a reflux path from a cooling surface in the vapor space to the subcooled boiling zone.

5. The process of claim 1, wherein:
the subcooled boiling zone is disposed in a horizontally elongated tank with an emulsion inlet zone adjacent one end and an overflow zone at the opposite end into the oil-rich layer recovery line;
the heat transfer surface comprises a plurality of longitudinal heat transfer surfaces below the vapor-liquid interface;
the subcooled boiling zone comprises a liquid flow path from the emulsion inlet zone to the overflow zone; and
the subcooled boiling zone comprises a bottoms drain into the aqueous-rich layer recovery line.

6. The process of claim 1, wherein the subcooled boiling zone comprises a heat transfer surface having a temperature in excess of the saturation temperature of the aqueous-rich layer, and wherein the vapor-liquid interface is subcooled with respect to the saturation temperature of the aqueous layer.

7. The process of claim 6, comprising a subcritical heat flux at the heat transfer surface for nucleate boiling.

8. The process of claim 7, further comprising:
indirectly heating the heat transfer surface with hot gas at a temperature from 400° C. to 1200° C. within a tube submerged in the oil-rich layer below the vapor liquid interface, wherein the heat transfer surface is maintained at a temperature above 110° C.; and
maintaining a gauge pressure at the vapor-liquid interface less than 20 kPa, wherein a partial pressure of water vapor at the vapor-liquid interface is less than one atmosphere absolute and wherein the vapor-liquid interface is maintained at a maximum temperature of 105° C.

9. A process, comprising:
operating a treating unit to heat an emulsion in a subcooled boiling zone, wherein the subcooled boiling zone is atmospherically vented, wherein the treating unit comprises:
 a heat transfer surface to contact the emulsion in the subcooled boiling zone at a temperature in excess of the saturation temperature of an aqueous phase in the emulsion, wherein a bulk fluid temperature in the subcooled boiling zone is below the saturation temperature of the aqueous phase of the emulsion;
 a line to recover an oil-rich layer from adjacent a vapor-liquid interface; and
 a line to recover an aqueous-rich layer from below the oil-rich layer;
recovering the oil-rich layer from adjacent the vapor-liquid interface; and
recovering the aqueous-rich layer from below the oil-rich layer;
wherein the treating unit comprises:
 a horizontally elongated vessel with a partition wall between a primary chamber and a secondary chamber;
wherein the primary chamber comprises:
 the subcooled boiling zone;
 a first vapor space;
 an atmospheric vent in communication with the vapor space;
 the vapor-liquid interface between the boiling zone and the vapor space;
 a preheating chamber in indirect heat exchange relationship with the vapor space and spaced above the vapor-liquid interface;
 a downcomer for emulsion from the preheating chamber into the boiling zone adjacent the partition wall;
 an overflow assembly at a first end of the vessel opposite the partition wall to drain the oil-rich layer from adjacent the vapor-liquid interface into an oil transfer pipe disposed adjacent a bottom of the primary chamber;
 a primary bottoms drain to recover the aqueous-rich layer from the primary chamber;
 a firetube assembly disposed below the vapor liquid interface comprising a plurality of longitudinal tubes with external heat transfer surfaces;
 a liquid flow path from the downcomer through the boiling zone across the plurality of longitudinal tubes to the overflow assembly;
wherein the secondary chamber comprises:
 an inlet zone adjacent the partition wall to receive the oil-rich layer from an end of the oil transfer pipe;
 an overflow weir at a second end of the vessel opposite the partition wall to drain an aqueous-lean layer from an upper liquid surface in the secondary chamber;
 a secondary bottoms drain to recover an aqueous-rich layer from the secondary chamber;
 a flow path from the inlet zone through the secondary chamber to the overflow weir.

10. The process of claim 9, wherein the vessel is mounted on a transportable skid.

11. The process of claim 9, wherein the vessel comprises a horizontal cylindrical tank.

12. The process of claim 9, wherein the partition wall forms a fluid seal between the primary and secondary chambers, and the oil transfer pipe passes through the partition wall to hydraulically couple the overflow assembly of the primary chamber to the inlet zone of the secondary chamber.

13. The process of claim 9, wherein the inlet zone is disposed adjacent a bottom of the secondary chamber.

14. The process of claim 9, the emulsion treater further comprising baffles disposed in the subcooled boiling zone for liquid crossflow across the tubes.

15. The process of claim 9, the treating unit further comprising a hot gas manifold at the first end of the vessel to supply hot gas to the firetube assembly.

16. The process of claim 9, the treating unit further comprising an atmospheric vent from a vapor space in the preheat chamber.

17. The process of claim 9, the treating unit further comprising an atmospheric vent from a vapor space in secondary chamber.

18. The process of claim 9, the treating unit further comprising a flow control system to control the rate of continuous emulsion feed to the preheating chamber relative to hot gas continuously supplied to the firetube assembly to maintain the external heat transfer surfaces of the firetube assembly at a temperature in excess of the boiling point of the aqueous layer while maintaining subcooling conditions in the primary chamber to vaporize less than 1 percent of water in the emulsion feed.

* * * * *